(12) United States Patent
Toda et al.

(10) Patent No.: US 11,243,729 B2
(45) Date of Patent: Feb. 8, 2022

(54) IMAGE RECORDING SYSTEM

(71) Applicant: Brother Kogyo Kabushiki Kaisha, Aichi-Ken (JP)

(72) Inventors: Yuta Toda, Nagoya (JP); Masayoshi Hayashi, Nagoya (JP); Yasuhiro Nakano, Nagoya (JP); Shunsuke Minamikawa, Nagoya (JP); Toshiro Ueda, Inazawa (JP); Haruka Azechi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/212,527

(22) Filed: Mar. 25, 2021

(65) Prior Publication Data
US 2021/0303245 A1 Sep. 30, 2021

(30) Foreign Application Priority Data
Mar. 27, 2020 (JP) .............................. JP2020-058214

(51) Int. Cl.
G06F 11/16 (2006.01)
G06F 3/12 (2006.01)

(52) U.S. Cl.
CPC ............ G06F 3/1261 (2013.01); G06F 3/121 (2013.01); G06F 3/1234 (2013.01); G06F 3/1285 (2013.01)

(58) Field of Classification Search
CPC ....... G06F 3/1261; G06F 3/121; G06F 3/1234
USPC .................... 358/1.15, 1.14, 502; 347/19, 47
See application file for complete search history.

(56) References Cited

U.S. PATENT DOCUMENTS

| 8,705,084 B2 | 4/2014 | Osada | |
|---|---|---|---|
| 2002/0089692 A1* | 7/2002 | Ferlitsch | G06F 3/1261 358/1.15 |
| 2006/0227363 A1* | 10/2006 | Ogura | G06F 3/1261 358/1.15 |
| 2007/0139461 A1 | 6/2007 | Izuo | |
| 2009/0284791 A1 | 11/2009 | Osada | |
| 2014/0300657 A1 | 10/2014 | Ike | |

FOREIGN PATENT DOCUMENTS

| JP | 2007-140959 A | 6/2007 |
|---|---|---|
| JP | 2007-152889 A | 6/2007 |
| JP | 2009-278243 A | 11/2009 |
| JP | 2011-031474 A | 2/2011 |
| JP | 2014-200982 A | 10/2014 |

* cited by examiner

Primary Examiner — Jamares Q Washington
(74) Attorney, Agent, or Firm — Banner & Witcoff, Ltd.

(57) ABSTRACT

An image recording system includes a plurality of image recording apparatuses. In a case where a certain image recording apparatus of the image recording apparatuses has a failure nozzle proportion of failure nozzles of all the nozzles of the recording head smaller than or equal to a threshold, image recording is performed on the certain image recording apparatus based on a recording instruction. In a case where the certain image recording apparatus has a failure nozzle proportion exceeding the threshold, a recording instruction is transmitted to a different image recording apparatus having a failure nozzle proportion smaller than that of the certain image recording apparatus, and image recording is performed on the different image recording apparatus based on the recording instruction.

16 Claims, 13 Drawing Sheets

IMAGE RECORDING SYSTEM

CROSS-REFERENCE TO RELATED APPLICATION

This application claims priority from Japanese Patent Application No. 2020-058214 filed on Mar. 27, 2020, the content of which is incorporated herein by reference in its entirety.

TECHNICAL FIELD

Aspects of the disclosure relate to an image recording system including a recording apparatus configured to record an image on a recording medium by ejecting liquid from nozzles.

BACKGROUND

As an image recording system including an image recording apparatus configured to eject liquid from nozzles, a known printer system includes a host computer and printers connected via a network to the host computer. In the printer system, when an application on the host computer issues a print request, the host computer obtains cleaning information from the printers, and calculates the rise time of each printer based on the obtained cleaning information. Then, the host computer transfers a print job to a printer with the shortest rise time, causing the printer to print the print job.

SUMMARY

According to an aspect of the disclosure, an image recording system includes a plurality of image recording apparatuses and server connected to the image recording apparatuses. Each image recording apparatus includes a recording head having nozzles and configured to eject liquid from each of the nozzles, a signal output unit configured to output a signal responsive to whether a nozzle of the nozzles is a failure nozzle having an abnormal condition in liquid ejection, and a controller connected to the signal output unit. In a certain image recording apparatus of the image recording apparatuses, the controller is configured to, in response to receiving a recording instruction to perform image recording: perform ejection determination by controlling the recording head to eject ink from each nozzle to determine, based on a signal outputted from the signal output unit, whether the nozzles include a failure nozzle; determine, based on an ejection determination result, whether a failure nozzle proportion of failure nozzles of all the nozzles of the recording head is smaller than or equal to a threshold; in response to determining that the failure nozzle proportion is smaller or equal to the threshold, control the recording head to perform image recording based on the recording instruction; and in response to determining that the failure nozzle proportion exceeds the threshold, transmit the recording instruction and the ejection determination result to the server. The server is configured to, in response to receiving the recording instruction and the ejection determination result from the certain image recording apparatus: determine whether the image recording apparatuses include a different image recording apparatus having a failure nozzle proportion smaller than that of the certain image recording apparatus; and in response to determining that the image recording apparatuses include a different image recording apparatus having a failure nozzle proportion smaller than that of the certain image recording apparatus, transmit the recording instruction to the different image recording apparatus. In the different image recording apparatus, the controller is configured to, in response to receiving the recording instruction from the server, control the recording head to perform image recording based on the recording instruction.

According to an aspect of the disclosure, an image recording system includes a plurality of image recording apparatuses and server connected to the image recording apparatuses and configured to receive a recording instruction to instruct a certain image recording apparatus of the image recording apparatuses to perform image recording. Each image recording apparatus includes a recording head having nozzles and configured to eject liquid from each of the nozzles, a signal output unit configured to output a signal responsive to whether a nozzle of the nozzles is a failure nozzle having an abnormal condition in liquid ejection, and a controller connected to the signal output unit. The server is configured to, in response to receiving the recording instruction, transmit, to the certain image recording apparatus, a determination instruction signal to perform an ejection determination by controlling the recording head to eject ink from each nozzle to determine, based on a signal output from the signal output unit, whether the nozzles include a failure nozzle. In the certain image recording apparatus, the controller is configured to, in response to receiving the determination instruction signal: perform the ejection determination and determine, based on an ejection determination result, whether a failure nozzle proportion of failure nozzles of all the nozzles of the recording head is smaller than or equal to a threshold; and transmit the ejection determination result to the server. The server is configured to, in response to receiving the ejection determination result indicating that the failure nozzle proportion is smaller than or equal to the threshold, transmit the recording instruction to the certain image recording apparatus. In the certain image recording apparatus, the controller is configured to, in response to receiving the recording instruction, control the recording head to perform image recording based on the recording instruction. The server is configured to, in response to receiving the ejection determination result indicating that the failure nozzle proportion exceeds the threshold: determine whether the image recording apparatuses include a different image recording apparatus having a failure nozzle proportion smaller than that of the certain image recording apparatus; and in response to determining that the image recording apparatuses include a different image recording apparatus having a failure nozzle proportion smaller than that of the certain image recording apparatus, transmit the recording instruction to the different image recording apparatus. In the different image recording apparatus, the controller is configured to, in response to receiving the recording instruction, control the recording head to perform image recording based on the recording instruction.

According to an aspect of the disclosure, an image recording system includes a plurality of image recording apparatuses connected to each other. Each image recording apparatus includes a recording head having nozzles and configured to eject liquid from each of the nozzles, a signal output unit configured to output a signal responsive to whether a nozzle of the nozzles is a failure nozzle having an abnormal condition in liquid ejection, and a controller connected to the signal output unit. In a certain image recording apparatus of the image recording apparatuses, the controller is configured to, in response to receiving a recording instruction to perform image recording: perform ejection determination by controlling the recording head to eject ink from each nozzle to determine, based on a signal outputted from the signal output unit, whether the nozzles include a failure nozzle; determine, based on an ejection determination result, whether a failure nozzle proportion of failure nozzles of all the nozzles of the recording head is smaller than or equal to a threshold; in response to determining that the failure nozzle proportion is smaller or equal to the threshold, control the recording head to perform image recording based on the recording instruction; and in response to determining that the failure nozzle proportion exceeds the threshold, transmit the recording instruction and the ejection determination result to an image recording apparatus of the image recording apparatuses, the image recording apparatus being different from the certain image recording apparatus.

According to the above aspects of the disclosure, in a case where an image recording apparatus that the user desires to use for image recording uses a longer period of time until the completion of image recording, a different image recording apparatus can be used to perform image recording in a shorter period of time.

DETAILED DESCRIPTION

In the known printer system described above, when the application on the host computer issues a print request, the print job is performed on the printer having the shortest rise time regardless of a user request.

Aspects of the disclosure provide an image recording system including a plurality of image recording apparatuses, the image recording system enabling one of the image recording apparatuses to perform image recording appropriately to circumstances to reflect a user request.

First Embodiment

Hereinafter, a first embodiment will be described with reference to the accompanying drawings.

General Configuration of Image Recording System

Figure 1:
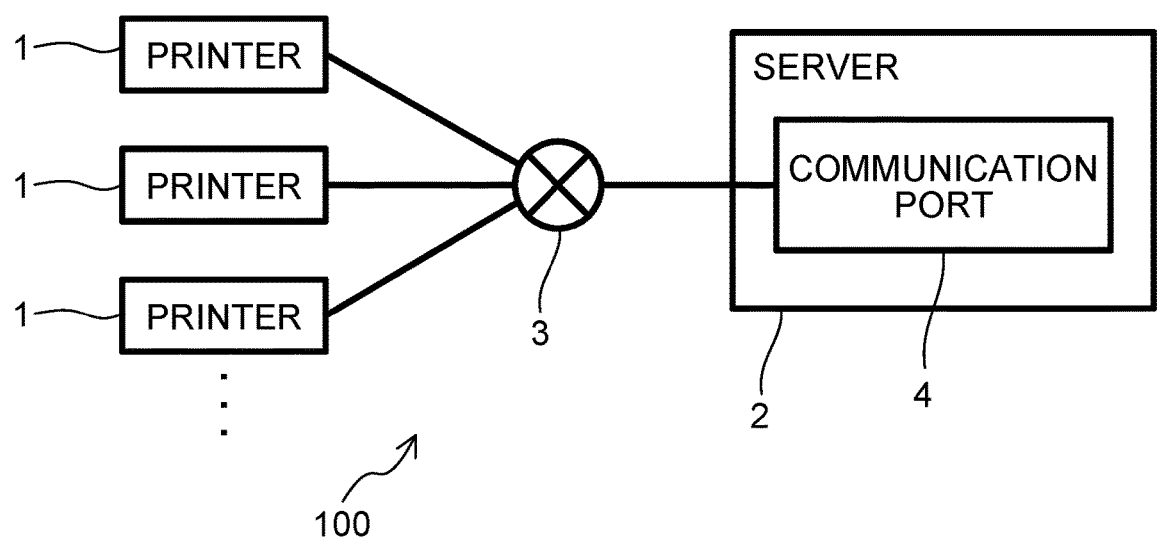
FIG. 1 is a block diagram illustrating a configuration of an image recording system.

As illustrated in FIG. 1, an image recording system 100 according to the first embodiment includes a plurality of printers 1 and a server 2, which are all connected to each other via a network 3 such as a LAN (Local Area Network). The printers 1 as an example of image recording apparatuses are identical in structure. Each printer 1 has a communication port 68 described later (in FIG. 5) connected to the network 3. The server 2 includes a communication port 4 as an example of a signal input device. The server 2 is connected to the network 3 via the communication port 4. The communication ports 68 and 4 are, for example, a LAN port.

General Configuration of Printer

Figure 2:
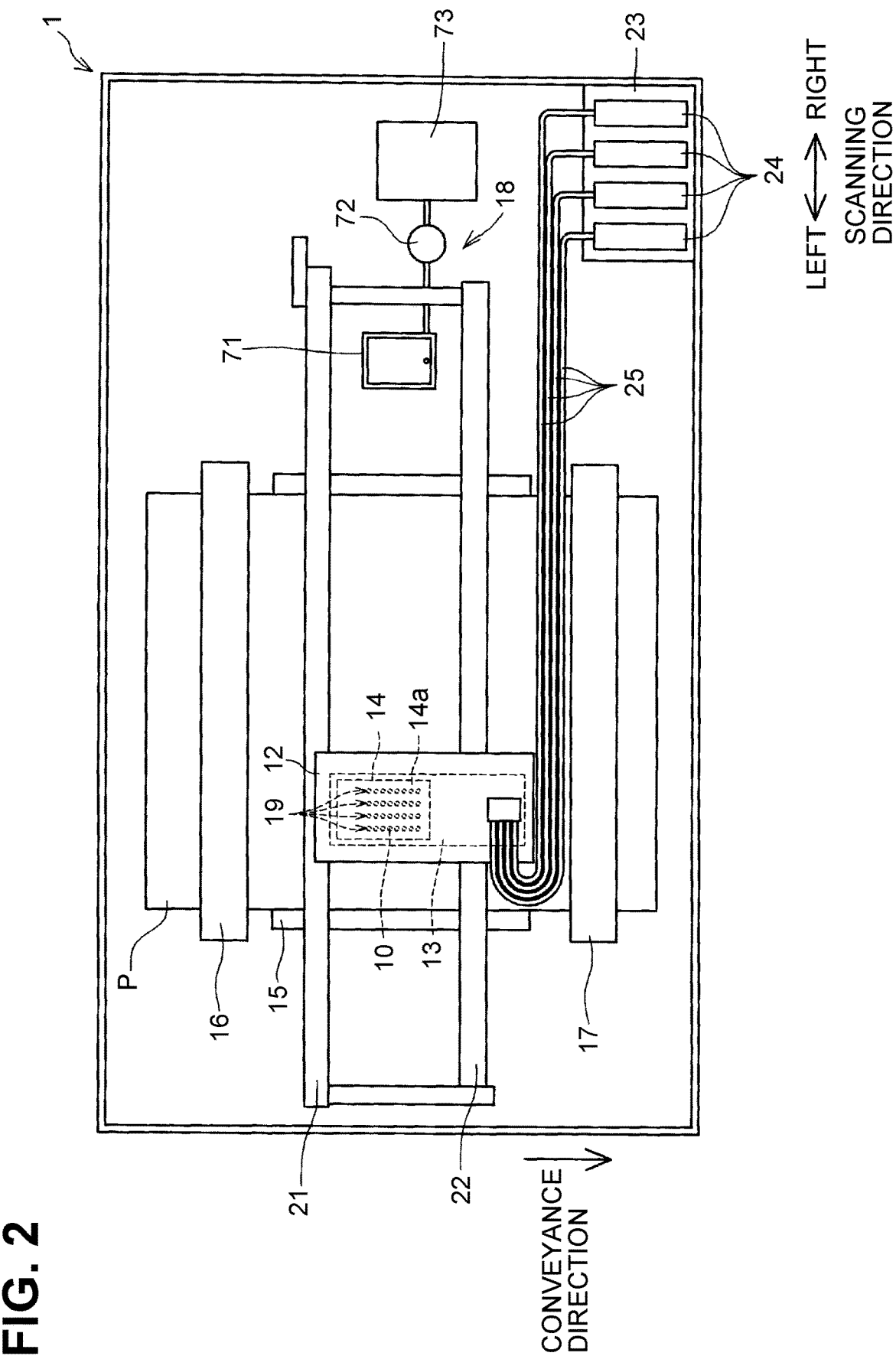
FIG. 2 is a schematic diagram illustrating a general configuration of a printer.

As illustrated in FIG. 2, each printer 1 includes a carriage 12, a subtank 13, an inkjet head 14 as an example of a recording head, a platen 15, conveyance rollers 16 and 17, and a maintenance unit 18 as an example of discharging means.

The carriage 2 is supported by two guide rails 21 and 22 each extending in a scanning direction (e.g., a right-left direction). The carriage 2 is configured to reciprocate in the scanning direction along the guide rails 21 and 22. The carriage 12 is connected to a carriage motor 86 (in FIG. 5) via a belt. In response to driving of the carriage motor 86, the carriage 12 moves in the scanning direction along the guide rails 21 and 22. The scanning direction corresponds to a right-left direction as illustrated in FIG. 2.

The subtank 13 is mounted on the carriage 12. The printer 1 further includes a cartridge holder 23. The cartridge holder 23 accommodates a plurality of, for example, four, ink cartridges 24 that are detachable. The four ink cartridges 24 arranged in the scanning direction store ink (as an example of liquid) of different colors, from right to left, black, yellow, cyan, and magenta, respectively. The subtank 13 is connected via four tubes 25 to the four ink cartridges 24 attached to the cartridge holder 23. Such a configuration thus enables supply of ink of the four colors to the subtank 13 from the four ink cartridges 24.

The inkjet head 14 is mounted on the carriage 12 and connected to a lower end of the subtank 13. The inkjet head 4 is supplied with ink of the four colors from the subtank 13. The inkjet head 14 has an array of nozzles 10 defined in a nozzle surface 14a that is its lower surface. The inkjet head 4 is configured to eject ink from the nozzles 10. Specifically, for example, the nozzles 10 are arranged in rows extending in a conveyance direction orthogonal to the scanning direction to form nozzle rows 19. The nozzle surface 14a has a plurality of, for example, four, nozzle rows 19 next to each other in the scanning direction. In the inkjet head 4, black ink is ejected from the nozzles 10 constituting the rightmost nozzle row 19 in the scanning direction. Yellow ink is ejected from the nozzles 10 constituting the nozzle row 19 to the left of the black nozzle row 19. Cyan ink is ejected from the nozzles 10 constituting the nozzle row 19 to the left of the yellow nozzle row 19. Magenta ink is ejected from the nozzles 10 constituting the nozzle row 19 to the left of the cyan nozzle row 19.

The platen 15 is disposed below the inkjet head 14 and faces the nozzles 10. The platen 15 extends in the scanning direction to have a dimension covering the entire width of a recording sheet S to be conveyed. The platen 5 is configured to support from below a recording sheet S being conveyed. The conveyance roller 16 is disposed upstream of the inkjet head 14 and the platen 15 in the conveyance direction. The conveyance roller 17 is disposed downstream of the inkjet head 14 and the platen 15 in the conveyance direction. The conveyance rollers 16 and 17 are connected to a conveyance motor 87 (in FIG. 5) via gears. In response to driving of the conveyance motor 87, the conveyance rollers 16 and 17 rotate to convey a recording sheet S in the conveyance direction.

The maintenance unit 18 includes a cap 71, a suction pump 72, and a waste liquid tank 73. The cap 71 is disposed to the right of the platen 15 in the scanning direction. When the carriage 12 is located in a maintenance position, the nozzles 10 face the cap 71. The maintenance position is further to the right than the platen 15 in the scanning direction.

Figure 5:
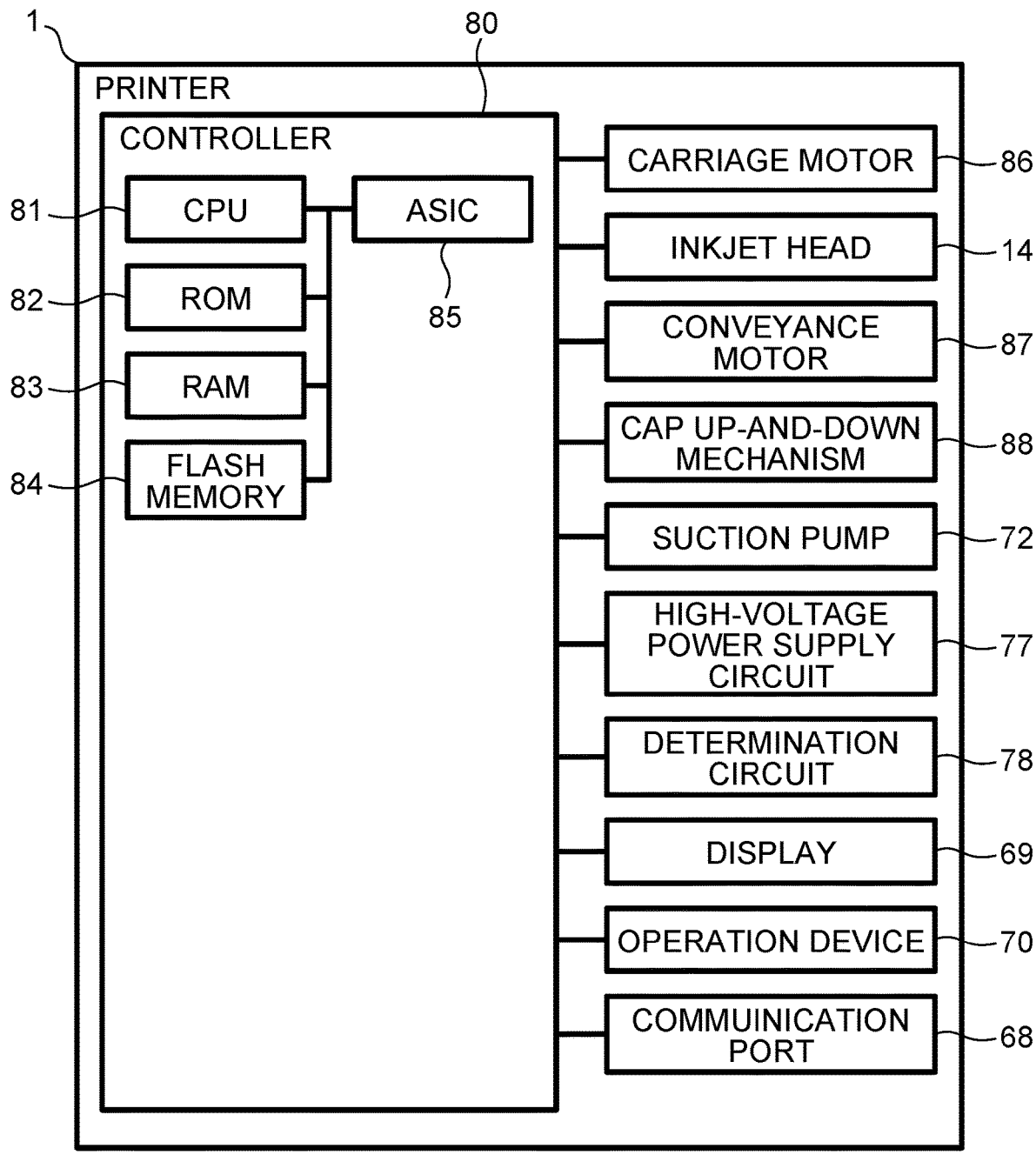
FIG. 5 is a block diagram illustrating an electrical configuration of the printer.

The cap 71 is movable upward and downward selectively by control of a cap up-and-down mechanism 88 (in FIG. 5). The carriage 12 is moved to stop at the maintenance position so that the nozzles 10 and the cap 71 face each other. In such a state, in response to the cap 71 being moved upward by the cap up-and-down mechanism 88, an upper end of the cap 71 fully contacts the nozzle surface 4a of the inkjet head 4 to cover the nozzles 10. At this time, the cap 71 that covers the nozzles 10 is in a capping state, and the nozzles 10 capped by the cap 71 are in a capped state. The cap 71 is not limited to have such a configuration that the upper end fully contacts the nozzle surface 4a to cover the nozzles 10. The cap 71 may be structured such that that the upper end fully contacts a frame surrounding the nozzle surface 14a of the inkjet head 14 to cover the nozzles 10.

The suction pump 72 may be a tube pump. The suction pump 72 is connected to the cap 71 and the waste liquid tank 73. The maintenance unit 18 uses the suction pump 72 to perform suction purging (as an example of a discharging operation) in which, in response to driving of the suction pump 72 in a state where the nozzles 10 are in the capped state, ink in the inkjet head 14 is pumped out or discharged from the nozzles 10. Ink discharged from the inkjet head 4 by suction purging is collected in the waste liquid tank 73.

For the sake of convenience, in this embodiment, the cap 71 covers all the nozzles 10 of the inkjet head 14 and suction purging is performed to discharge ink in the inkjet head 4 from all the nozzles 10. In some embodiments, the maintenance unit 8 may include a plurality of caps 71, one for covering the nozzles 10 constituting the rightmost nozzle row 19 from which black ink is discharged, and the other for covering the nozzles 10 constituting the remaining three nozzle rows 19 from which respective color inks (e.g., yellow, cyan, and magenta inks) are discharged. Such a configuration may enable suction purging to discharge black ink or color inks selectively in the inkjet head 14. Alternatively, for example, the maintenance unit 8 may include a plurality of caps 71 for respective nozzle rows 19. Such a configuration may enable ink to be discharged from the nozzles 10 of the inkjet head 4 on a nozzle row 19 basis.

Figure 3:
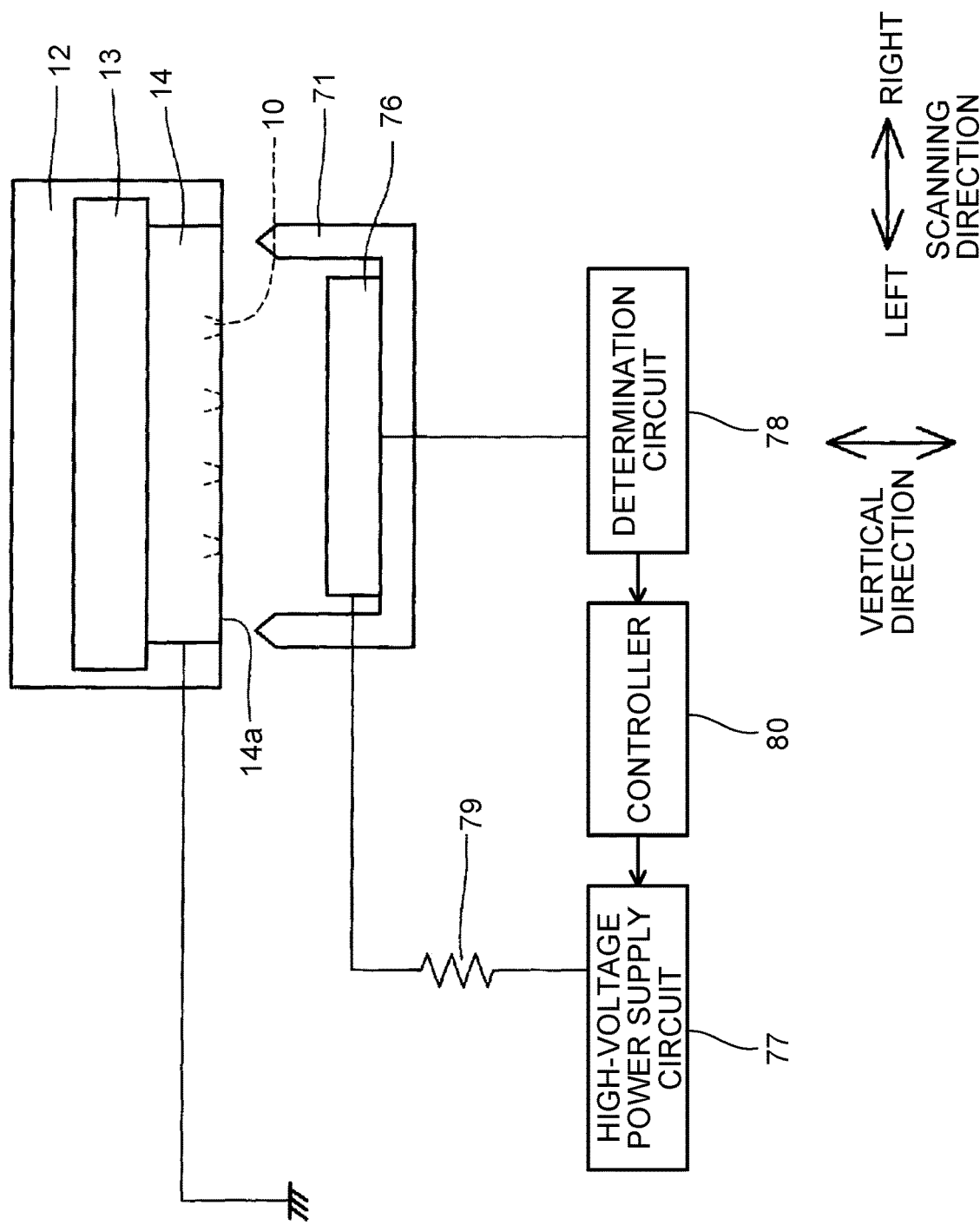
FIG. 3 illustrates a detection electrode disposed in a cap, a connection relationship between the detection electrode and a high-voltage power supply circuit, and a connection relationship between the detection electrode and a determination circuit.

As illustrated in FIG. 3, a detection electrode 76 having a rectangular planar shape is disposed within the cap 71. The detection electrode 76 is connected to a high-voltage power supply circuit 77 via a resistor 79. The detection electrode 76 receives a predetermined positive potential (e.g., 300 v) by the high-voltage power supply circuit 77 during an ejection determination process described later. In contrast, the inkjet head 14 is maintained at the ground potential. The potential at the detection electrode 76 then becomes the potential at the inkjet head 14. This causes a potential difference between the inkjet head 14 and the detection electrode 76. The detection electrode 76 is connected to a determination circuit 78. The detection circuit 78 compares a potential of a signal outputted from the detection electrode 76 with a threshold value Vt, and outputs a signal responsive to a comparison result.

Figure 4A:
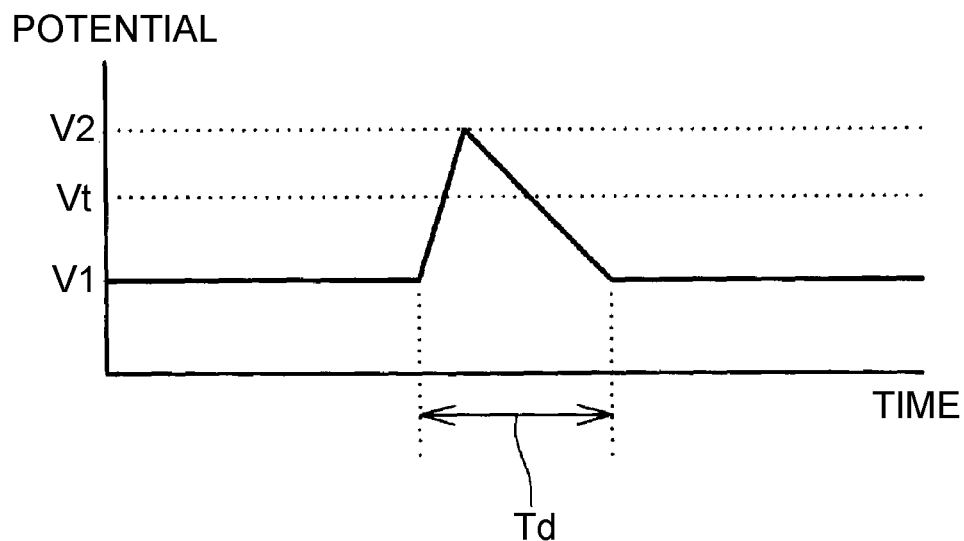
FIG. 4A is a graph showing changes in potential of the detection electrode in a case where ink has been ejected from a nozzle.

As the detection electrode 76 and the inkjet head 14 have a potential difference therebetween, ink becomes charged when ejected from a nozzle. When the carriage 12 is at the maintenance position, ink is ejected from a nozzle 10 toward the detection electrode 76. As illustrated in FIG. 4A, until the charged ink approaches and reaches the detection electrode 76, the potential of the detection electrode 76 rises from a potential V1 at which the inkjet head 14 is not driven, and reaches a potential V2, which is higher than the potential V1. After the charged ink reaches the detection electrode 76, the potential of the detection electrode 76 gradually lowers to the potential V1. In other words, the potential of the detection electrode 76 changes in a driving period Td during which the inkjet head 14 is driven.

Figure 4B:
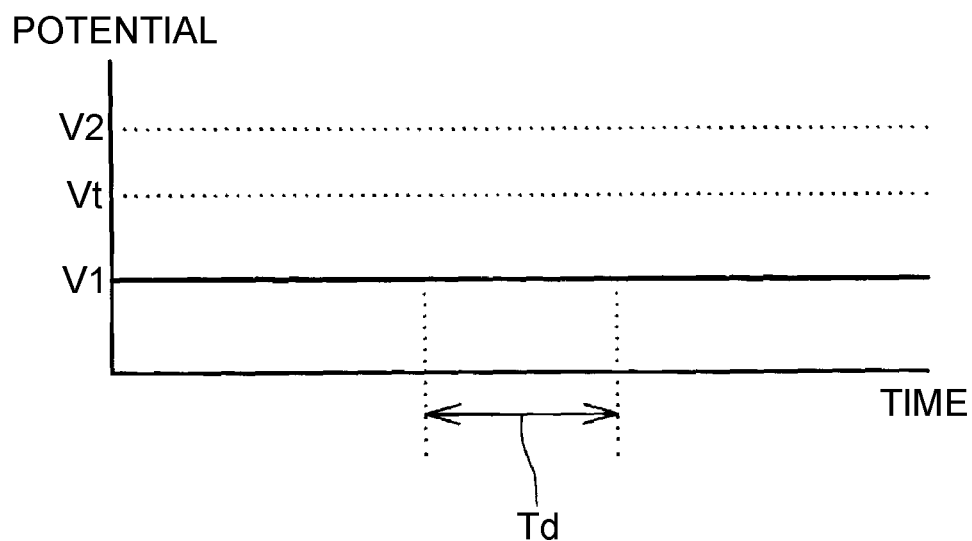
FIG. 4B is a graph showing no change in potential of the detection electrode in a case where ink has not been ejected from a nozzle.

In contrast, in a case where ink is not ejected from a nozzle 10 while the inkjet head 4 is driven, as illustrated in FIG. 4B, the potential of the detection electrode 76 hardly changes from the potential V1 in the driving period Td of the inkjet head 4. The determination circuit 78 uses the threshold value Vt satisfying an equation $V1<Vt<V2$ to discriminate whether ink is ejected or not ejected from a nozzle 10. The detection circuit 78 compares a maximum potential of a voltage signal outputted from the detection electrode 76 with a threshold value Vt, and outputs a signal responsive to a comparison result. In the first embodiment, a combination of the detection electrode 76, the high-voltage power supply circuit 77, the resistor 79, and the determination circuit 78 is an example of a signal output unit. The signal output unit outputs a signal responsive to whether a nozzle 10 is a failure nozzle having an abnormal condition in ink ejection. Specifically, a failure nozzle in this case is a nozzle that does not eject ink. The high-voltage power supply circuit 77 may apply a negative potential (e.g., −300 V) to the detection electrode 76 instead of a positive potential. In this case, where the carriage 12 is at the maintenance position and ink is ejected from a nozzle 10 toward the detection electrode 76, the potential of the detection electrode 76 may lower from the potential V1 until the charged ink approaches and reaches the detection electrode 76, and may gradually rise to the potential V1 after the charged ink reaches the detection electrode 76.

Electrical Configuration of Printer

Hereinafter, a description will be provided on an electrical configuration of a printer 1. As illustrated in FIG. 5, the printer 1 includes a controller 80 that controls operation of the printer 1. The controller 80 includes a CPU 81, a ROM 82, a RAM 83, a flash memory 84, and an ASIC 85. The controller 80 controls the carriage motor 86, the inkjet head 14, the conveyance motor 87, the cap up-and-down mechanism 88, the suction pump 72, and the high-voltage power supply circuit 77.

The controller 80 receives a signal responsive to whether a nozzle is a failure nozzle, from the determination circuit 78. The printer 1 includes a display 69 (as an example of a notification device), an operation device 70, and the communication port 68. The display 69 may include a liquid crystal display. The controller 80 controls the display 69 to display information and messages related to the operations of the printer 1. The operation device 70 includes buttons provided on the printer 1 and a touch screen provided on the display 69. In response to the user operating the operation device 70, the controller 80 receives a signal responsive to the operation. The communication port 68 is a LAN port, for example, and the controller 80 is connected via the communication port 68 to the network 3.

In the controller 80, only the CPU 81 or the ASIC 85 may perform all processing or a combination of the CPU 81 and the ASIC 85 may perform all processing. Alternatively, the controller 80 may include a single CPU 81 that may perform all processing or include a plurality of CPUs 81 that may share all processing. Alternatively, the controller 80 may include a single ASIC 85 that may perform all processing or include a plurality of ASICs 85 that may share all processing.

Control in Image Recording

Hereinafter, a description will be provided on a process in image recording in the image recording system 100. In the image recording system 100, when a user inputs a recording instruction to a printer 1 to perform image recording by operating the operation device 70 of the printer 1, each printer 1 and the server 2 perform processing described below, and image recording is performed on any one of the printers 1. A recording instruction may be inputted through a PC connected to a printer 1 instead of the operation device 70 of the printer 1.

Each printer 1 has a normal-quality image mode (as an example of a first recording mode) and a high-quality image mode (as an example of a second recording mode) where image recording is performed with a higher quality than that of the normal-quality mode. The recording instruction includes information on whether image recording is performed in the normal-quality image mode or the high-quality image mode.

Figure 6C:
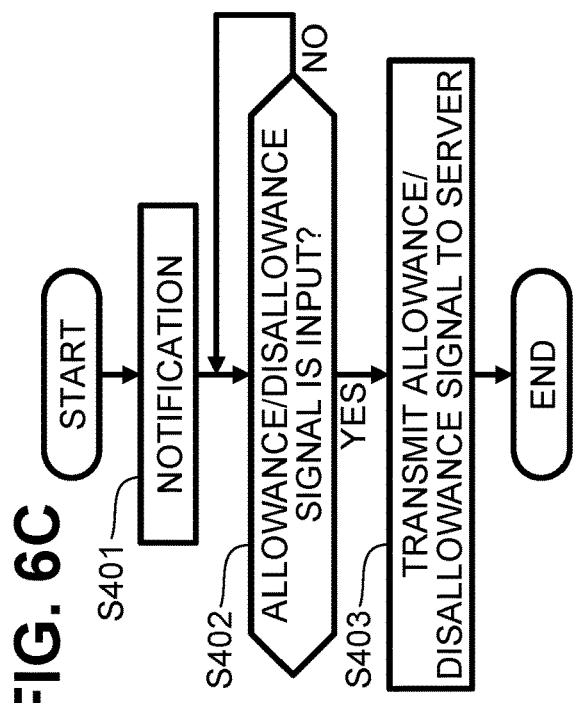
FIG. 6C is a flowchart of a process performed in a printer in response to receiving a notification signal.

Hereinafter, a description will be provided on processing in each printer 1 in image recording. In each printer 1, in response to receiving a recording instruction inputted on the operation device 70, the controller 80 executes processing in accordance with the flowchart of FIG. 6A.

More specifically, the controller 80 first performs ejection determination (S101). In the ejection determination in S101, the controller 80 controls the carriage motor 86 to move the carriage 12 to the maintenance position. The controller 80 further controls the high-voltage power supply circuit 77 to apply the potential to the detection electrode 76. In this state, the controller 80 controls the inkjet head 14 to eject ink from each of the nozzles 10 in sequence. The controller 80 determines whether a nozzle is a failure nozzle based on a signal outputted from the determination circuit 78.

Based on an ejection determination result in S101, the controller 80 determines whether the proportion P of failure nozzles to all the nozzles 10 of the inkjet head 14 (hereinafter referred to as a failure nozzle proportion P) is smaller than or equal to a threshold Pt (S102).

In response to determining that the failure nozzle proportion P is smaller than or equal to the threshold Pt (S102: YES), the controller 80 performs image recording (S103). In image recording in S103, based on the recording instruction, the controller 80 controls the carriage motor 86 to move the carriage 12 in the scanning direction, and controls the inkjet head 14 to eject ink from the nozzles 10, and controls the conveyance motor 87 to cause the conveyance rollers 16 and 17 to convey a recording sheet S for a predetermined distance. The controller 80 controls them repeatedly to perform image recording on the recording sheet S.

In contrast, in response to determining that the failure nozzle proportion P exceeds the threshold Pt (S102: NO), the controller 80 transmits the received recording instruction and the ejection determination result in S101 to the server 2 (S104).

Figure 7:
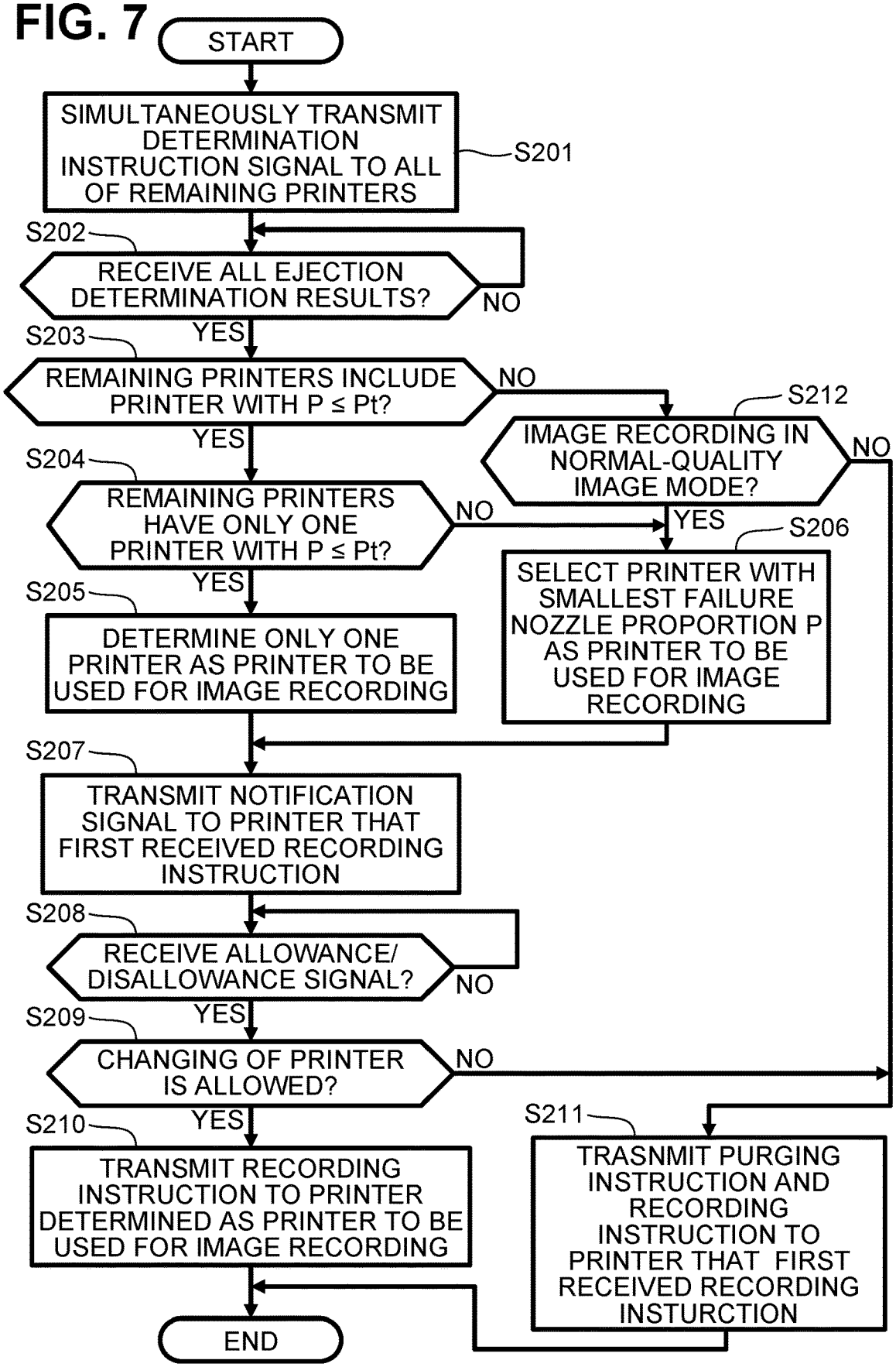
FIG. 7 is a flowchart of a process performed in the server in image recording.

The server 2 executes processing in accordance with the flowchart of FIG. 7 in response to receiving the recording instruction and the determination result transmitted from the controller 80 of a certain printer 1 in S104.

More specifically, the server 2 first transmits a determination instruction signal to perform ejection determination to all of the remaining printers 1 except the certain printer 1 (S201).

Figure 6D:
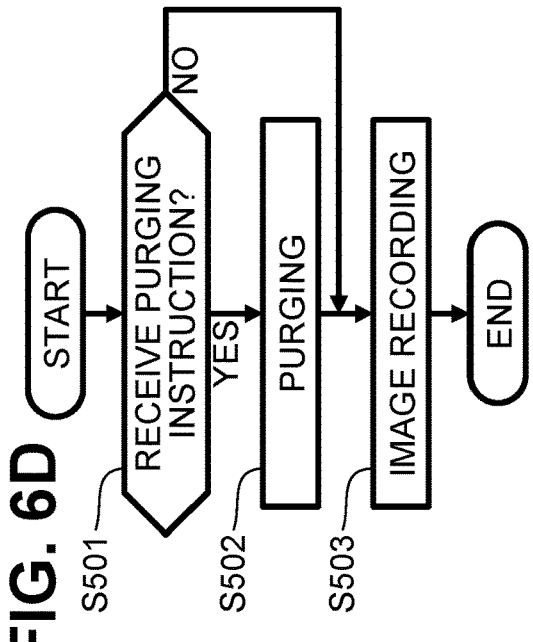
FIG. 6D is a flowchart of a process performed in a printer in response to receiving a recording instruction from a server.
Figure 6A:
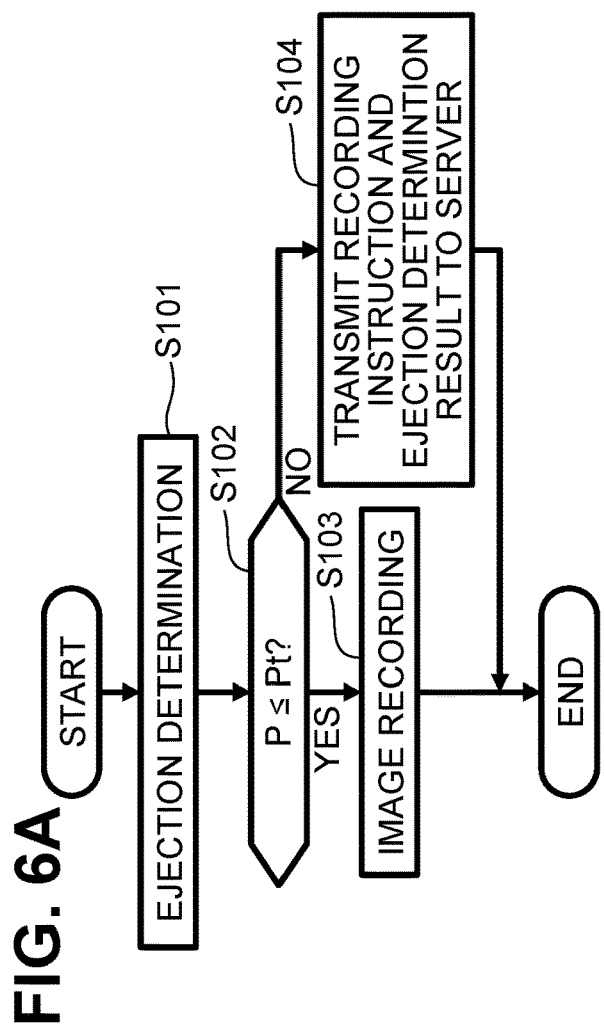
FIG. 6A is a flowchart of a process performed in a printer in response to receiving a recording instruction based on an operation of an operation device.
Figure 6B:
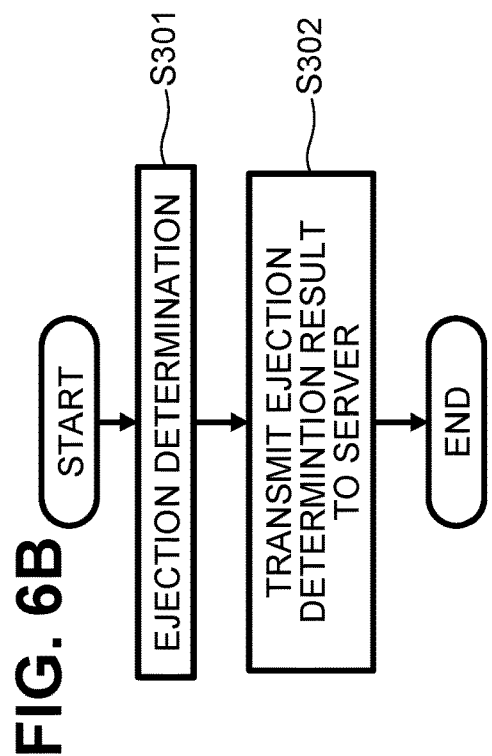
FIG. 6B is a flowchart of a process performed in a printer in response to receiving a determination instruction signal.

In each of the remaining printers 1 having received the determination instruction signal, the controller 80 performs processing in accordance with the flowchart of FIG. 6B. More specifically, the controller 80 performs ejection determination as with S101 (S301) and transmits a determination result to the server 2 (S302).

Referring back to FIG. 7, the server 2 waits until it receives ejection determination results from all of the remaining printers 1 except the certain printer 1 (S202: NO). In response to receiving all ejection determination results (S202: YES), the server 2 determines whether the remaining printers 1 include a printer 1 with a failure nozzle proportion P smaller than or equal to the threshold Pt (S203). In the determination in S203, the failure nozzle proportion P of the certain printer 1 exceeds the threshold Pt. If the remaining printers 1 include a printer 1 with a failure nozzle proportion P smaller than or equal to the threshold Pt, the failure nozzle proportion P of the printer 1 is smaller than that of the certain printer 1.

In response to determining that the remaining printers 1 include a printer 1 with a failure nozzle proportion P smaller than or equal to the threshold Pt (S203: YES), the server 2 determines whether the remaining printers 1 have only one printer 1 with a failure nozzle proportion P smaller than or equal to the threshold Pt (S204). In response to determining that the remaining printers 1 have only one printer 1 with a failure nozzle proportion P smaller than or equal to the threshold Pt (S204: YES), the server 2 determines the only one printer 1 as a printer 1 to be used for image recording. In response to determining that the remaining printers 1 include one or more printers 1 each with a failure nozzle proportion P smaller than or equal to the threshold Pt (S204: NO), the server 2 selects a printer 1 having the smallest failure nozzle proportion P from the one or more printers 1 and determines the selected printer 1 as a printer 1 to be used for image recording (S206), and the process proceeds to S207.

In S207, the server 2 transmits a notification signal to the certain printer 1 that first received the recording instruction, for providing notification that a printer 1 to be used for image recording is changed. The server 2 then sets the communication port 4 to be ready to accept the input of an allowance/disallowance signal indicating whether changing of a printer 1 to be used for image recording is allowed or disallowed. In the certain printer 1, the controller 80 executes processing in accordance with the flowchart of FIG. 6C in response to receiving a notification signal. More specifically, the controller 80 performs notification (S401). In notification in S401, the controller 80 controls the display 69 to display a message for providing notification that a printer 1 to be used for image recording is changed, and a message prompting a user to input an allowance/disallowance signal indicating whether changing of a printer to be used for image recording is allowed or disallowed. The controller 80 then waits until an allowance/disallowance signal is input by the user that operates the operation device 70 in response to the message (S402: NO). In response to the input of the allowance/disallowance signal (S402: YES), the controller 80 transmits the allowance/disallowance signal to the server 2 (S403).

Returning back to FIG. 7, the server 2 waits until it receives the allowance/disallowance signal (S208: NO). In response to receiving the allowance/disallowance signal (S208: YES), the server 2 determines whether the allowance/disallowance signal indicates that the changing of a printer 1 to be used for image recording is allowed (S209). In response to determining that the allowance/disallowance signal indicates that the changing of a printer 1 to be used for image recording is allowed (S209: YES), the server 2 transmits the received recording instruction to a printer 1 determined in S205 or S206. In response to determining that the allowance/disallowance signal indicates that the changing of a printer 1 to be used for image recording is disallowed (S209: NO), the controller 80 transmits, to the certain printer 1 that first received the recording instruction, a purging instruction to perform suction purging (as an example of a discharging instruction signal) and the recording instruction (S211).

In contrast, in response to determining that none of the printers 1 have a failure nozzle proportion P smaller than or equal to the threshold Pt, that is, each printer 1 has a failure nozzle proportion P exceeding the threshold Pt (S203: NO), the server 2 determines whether the recording instruction indicates image recording in the normal-quality image mode (S212). In response to determining that the recording instruction indicates image recording in the normal-quality image mode (S212: YES), the server 2 selects a printer 1 having the smallest failure nozzle proportion P from the one or more printers 1 and determines the selected printer 1 as a printer to be used for image recording (S206), and then performs steps S207 to S211 described above.

In response to determining that each printer 1 has a failure nozzle proportion P exceeding the threshold Pt (S203: NO) and the recording instruction indicates image recording in the high-quality image mode (S212: NO), the server 2 transmits a purging instruction and the recording instruction to the certain printer 1 that first received the recording instruction (S211).

In a printer 1 that receives the purging instruction and the recording instruction transmitted from the server 2 in S210 or the recording instruction transmitted from the server in S211, the controller 80 executes processing in accordance with the flowchart of FIG. 6D.

More specifically, if the controller 80 does not receive the purge instruction, in other words, if the controller 80 receives the recording instruction only (S501: NO), the controller 80 performs image recording (S503). In response to receiving the purging instruction (S501: YES), the controller 80 performs purging (S502) and then proceeds image recording in S503. In purging in S502, the controller 80 controls the carriage motor 86, the cap up-and-down mechanism 88 and the suction pump 72 to perform the suction purging described above. Image recording in S503 is similar to that in S103.

Effects

In a case where image recording is performed on a user-specified printer having a high failure nozzle proportion P, suction purging is performed before image recording. In this case, a period of time from reception of a recording instruction to the completion of image recording is extended by the length of the suction purging.

In the first embodiment, however, when a certain printer 1 receives a recording instruction and has a failure nozzle proportion P smaller than or equal to the threshold Pt, the server 2 allows the certain printer 1 to perform image recording. In contrast, if the certain printer 1 has a failure nozzle proportion P exceeding the threshold Pt and a different printer has a failure nozzle proportion P smaller than that of the certain printer 1, the server 2 allows the different printer 1 to perform image recording.

In a case where the certain printer 1 does not perform suction purging before image recording, the period of time until the completion of image recording is not extended. In this case, image recording can be performed on the certain printer 1 in accordance with the user selection even if the server 2 selects a printer 1 having a smaller failure nozzle proportion P than that of the certain printer 1. In contrast, in a case where the certain printer 1 performs suction purging before image recording, the period of time until the completion of image recording is extended by the length of the suction purging. In this case, a printer 1 other than the certain printer 1 may be used to perform image recording and to shorten the period of time until the completion of image recording.

In the first embodiment, in response to receiving the recording instruction and the ejection determination result from the certain printer 1, the server 2 transmits a determination instruction signal to all printers 1 except the certain printer 1, causes the printers 1 to perform the ejection determination and transmit the result to the server 2. Based on the ejection determination results received from the printers 1, the server 2 can determine whether the printers 1 include a printer 1 having a failure nozzle proportion P smaller than or equal to the threshold Pt.

At this time, the server 2 transmits a determination instruction signal to the printers 1 except the certain printer 1 simultaneously. In response to receiving the determination instruction signal, the printers 1 perform ejection determination at substantially the same time. This can shorten the length of time until the ejection determination is finished in each of the printers 1, compared to a case where the printers 1 receive the determination instruction signal one after another.

In a case where each printer 1 of the image recording system 100 has a failure nozzle proportion P exceeding the threshold Pt, when image recording is performed in the normal-quality image mode where the high image quality is not required, a printer 1 having the smallest failure nozzle proportion P is used to perform image recording. This enables image recording to be performed with the image quality as high as possible and in a period of time as short as possible.

For image recording in the high-quality image mode in the certain printer 1, suction purging is performed before image recording. This enables image recording with high quality on the printer 1 the user desires to perform.

In a case where the certain printer 1 has a failure nozzle proportion P exceeding the threshold Pt and the printers 1 connected to the certain printer 1 include two or more printers 1 having a failure nozzle proportion P smaller than or equal to the threshold Pt, one of the two or more printers 1 having the smallest failure nozzle proportion P is used to perform image recording. This maintains the quality of images to be recorded as high as possible.

In some circumstances, the user may not want to perform image recording on any printer 1 other than the printer 1 the user selects. In the first embodiment, in a case where the certain printer 1 has a failure nozzle proportion P exceeding the threshold Pt and the printers 1 connected to the certain printer 1 include a printer 1 having a failure nozzle proportion P smaller than or equal to the threshold Pt, the server 2 transmits a notification signal to the certain printer 1 to notify the user that a printer to be used for image recording is changed from the certain printer 1 to the printer 1. Then, only when the user inputs an allowance/disallowance signal indicating that image recording on the different printer 1 is allowed, the server 2 allows the different printer 1 to perform image recording.

Second Embodiment

Figure 8:
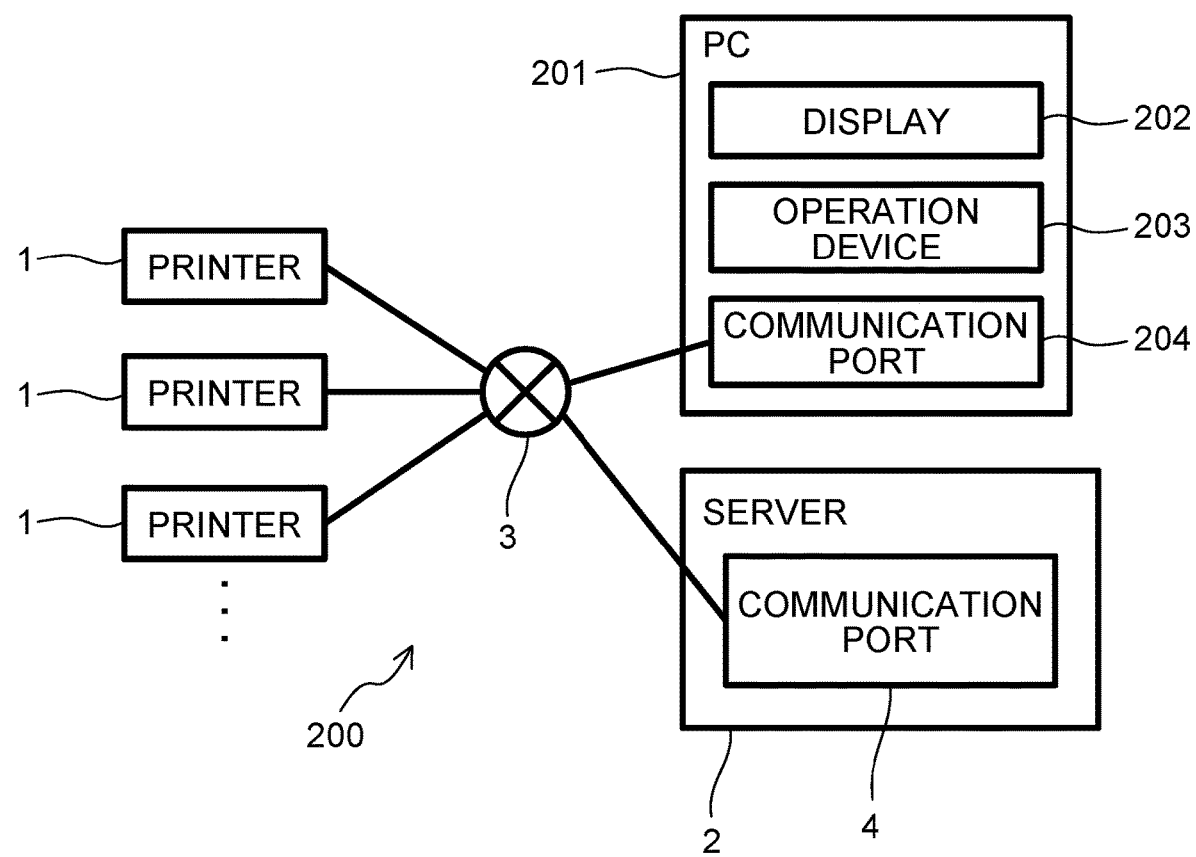
FIG. 8 is a block diagram illustrating a configuration of an image recording system.

Hereinafter, a second embodiment will be described with reference to the accompanying drawings. As illustrated in FIG. 8, an image recording system 200 according to the second embodiment includes at least one PC 201 (as an example of an external apparatus), in addition to a plurality of printers 1 and a server 2 similar to those in the image recording system 100. The PC 201 includes a display 202 (as an example of a notification device), an operation device 203, and a communication port 204. The display 202 may include a liquid crystal display to display information and messages related to the operations of a printer 1 on the PC 201. The operation device 203 includes input devices such as a mouse and a keyboard. The communication port 204 is a LAN port, for example, and the PC 201 is connected via the communication port 204 to the network 3.

Figure 9:
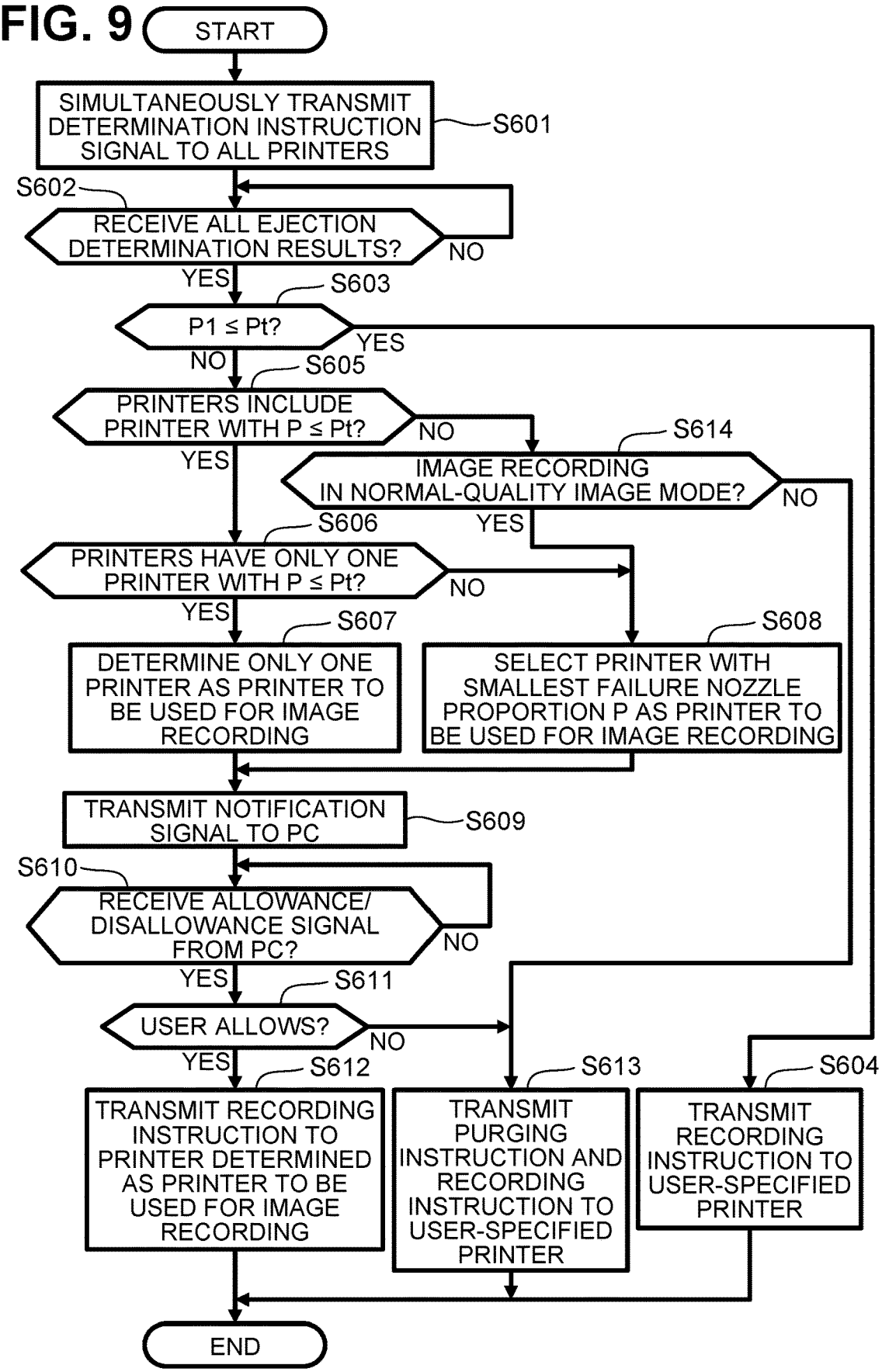
FIG. 9 is a flowchart of a process performed in a server of the image recording system in image recording.

In the second embodiment, for image recording in the image recording system 200, the controller 80 of each printer 1, the server 2, and the PC 201 perform processing described below. In the second embodiment, a user operates the operation device 203 of the PC 201 to transmit a recording instruction to the server 2. The recording instruction includes information on a user-specified printer 1 (an example of a certain image recording apparatus). In response to receiving the recording instruction from the PC 201, the server 2 executes processing in accordance with the flowchart of FIG. 9.

More specifically, in response to receiving the recording instruction from the PC 201, the server 2 simultaneously transmits a determination instruction signal to perform ejection determination to all printers 1 including the user-specified printer 1 (S601). Each of the printers 1 having received the determination instruction signal performs processing in accordance with the flowchart of FIG. 6B as described in the first embodiment. The server 2 waits until it receives ejection determination results from all printers 1 (S602: NO). In response to receiving all ejection determination results (S602: YES), the server 2 determines whether, in a user-specified printer 1, a failure nozzle proportion P smaller than or equal to the threshold Pt (S603). If the server 2 determines that the failure nozzle proportion P is smaller than or equal to the threshold Pt (S603: YES), the server 2 transmits a recording instruction to the user-specified printer 1 (S604).

Inf the server 2 determines that the failure nozzle proportion P exceeds the threshold Pt (S603: NO), the server 2 performs steps S605 to S614, which are similar to steps S203 to S212 described above. However, in S609 of the second embodiment, unlike S207, the server 2 transmits a notification signal to the PC 201. The PC 201 performs processing in a similar manner that the controller 80 performs as shown in FIG. 6C.

In a step corresponding to notification in S401, the PC 201 controls the display 202 to display a message for providing notification that a printer 1 to be used for image recording is changed, and a message prompting a user to input an allowance/disallowance signal indicating whether changing of a printer to be used for image recording is allowed or disallowed. In a step corresponding to S402, the PC 201 determines whether an allowance/disallowance signal is input by the user that operates the operation device 203 in response to the message.

In S605, the user-specified printer 1 has the failure nozzle proportion P1 exceeding the threshold Pt, and thus a printer 1 determined to have a failure nozzle proportion P smaller than or equal to the threshold Pt in S605 has a failure nozzle proportion P smaller than the failure nozzle proportion P1.

In a printer 1 that received from the server 2 the recording instruction in S604 or S612 or a purging instruction and the recording instruction in S613, the controller 80 executes processing in accordance with the flowchart of FIG. 6D as in the case with the first embodiment.

Effects

In a case where image recording is performed on a user-specified printer having a high failure nozzle proportion P, suction purging is performed before image recording. In this case, a period of time from reception of a recording instruction to the completion of image recording is extended by the length of the suction purging.

In the second embodiment, however, in a case where a certain printer 1 specified by the user has a failure nozzle proportion P smaller than or equal to the threshold Pt, the server 2 allows the certain printer 1 to perform image recording. In a case where the certain printer 1 has a failure nozzle proportion P exceeding the threshold Pt and the printers 1 connected to the certain printer 1 include a printer 1 having the smallest failure nozzle proportion P, the server 2 allows the printer 1 to perform image recording.

In a case where the certain printer 1 does not performs suction purging before image recording, the period of time until the completion of image recording is not extended. In this case, image recording can be performed on the certain printer 1 in accordance with the user selection even if the server 2 selects a printer 1 having a smaller failure nozzle proportion P than that of the certain printer 1. In contrast, in a case where the certain printer 1 performs suction purging before image recording, the period of time until the completion of image recording is extended by the length of the suction purging. In this case, a printer 1 other than the certain printer 1 may be used to perform image recording and to shorten the period of time until the completion of image recording.

In the second embodiment, in response to receiving a recording instruction to perform image recording on the certain printer 1, the server 2 transmits a determination instruction signal to all printers 1 including the certain printer 1. Based on the ejection determination results received from the printers 1, the server 2 can determine whether, in the certain printer 1, the failure nozzle proportion P1 exceeds the threshold Pt and whether the printers 1 include a printer 1 having a failure nozzle proportion P smaller than or equal to the threshold Pt.

At this time, the server 2 transmits the determination instruction signal to all printers 1 including the certain printer 1 simultaneously, and thus all printers 1 perform ejection determination simultaneously. This can shorten the length of time until the ejection determination is finished in each of the printers 1, compared to a case where the printers 1 receive the determination instruction signal one after another.

In some circumstances, the user may not want to perform image recording on any printer 1 other than the printer 1 the user selects. In the second embodiment, in a case where the certain printer 1 has a failure nozzle proportion P exceeding the threshold Pt and the printers connected to the certain printer 1 include a printer having a failure nozzle proportion P smaller than or equal to the threshold Pt, the server 2 transmits a notification signal to the PC 201 to notify the user that a printer 1 to be used for image recording is changed. Then, only when the user inputs an allowance/disallowance signal indicating that image recording on a different printer 1 is allowed, the server 2 allows the different printer 1 to perform image recording.

Third Embodiment

Figure 10:
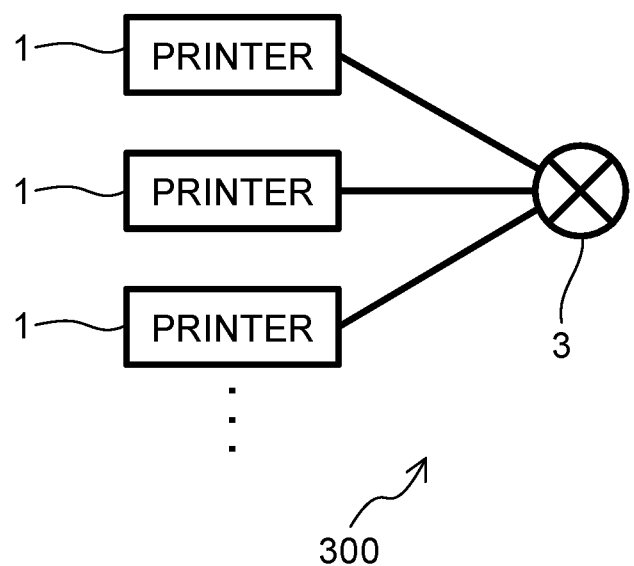
FIG. 10 is a block diagram illustrating a configuration of an image recording system.

Hereinafter, a third embodiment will be described with reference to the accompanying drawings. As illustrated in FIG. 10, an image recording system 300 according to the third embodiment includes a plurality of printers 1 that are connected to each other via a network 3. The printers 1 are identical in structure as in the case with the first and second embodiments.

In the image recording system 300, a user operates an operation device 70 on a printer 1 (as an example of a certain image recording apparatus), and thus the printer 1 receives a recording instruction. In each printer 1 of the image recording system 300, the controller 80 executes processing in accordance with the flowchart of FIG. 11 in response to receiving a recoding instruction.

More specifically, in response to receiving a recording instruction, a controller 80 of each printer 1 determines whether the received recording instruction is a returned recording instruction in S709 (701). In the third embodiment, each printer 1 receives one of the following recording instructions: an original recording instruction received through the user operation of an operation device 70 owned by the printer 1; a transmitted recording instruction in S706 described later; and a returned recording instruction in S709 described later.

In a case where the received recording instruction is not a returned recording instruction (S701: NO), the controller 80 performs the same ejection determination as in S101 (S702) and determines whether a failure nozzle proportion P is smaller than or equal to the threshold Pt (S703) based on the ejection determination result. In response to determining that the failure nozzle proportion P is smaller than or equal to the threshold Pt (S703: YES), the controller 80 performs the same image recording as in S103 (S704), and ends the process.

In response to determining that the failure nozzle proportion P exceeds the threshold Pt (S703: NO), the controller 80 determines whether the remaining printers include a printer 1 that is yet to receive the recording instruction (S705). In response to determining that the remaining printers 1 include a printer that is yet to receive the recording instruction (S705: YES), the controller 80 transmits the recording instruction to the printer 1 (S706). Subsequently, the controller 80 determines whether the received recording instruction is a recording instruction transmitted from a different printer 1 (S707).

In response to determining that the received recording instruction is a recording instruction transmitted from a different printer 1 (S707: YES), the controller 80 ends the process. In response to determining that the received recording instruction is not a recording instruction transmitted from a different printer 1, in other words, is an original recording instruction received through the user operation of the operation device 70 (S707: NO), the controller 80 performs the same purging as in S502 (S708), and ends the process.

In contrast, in response to determining that the remaining printers include no printer 1 that is yet to receive the recording instruction (S705: NO), the controller 80 transmits the recording instruction to a printer 1 that first received the recording instruction, in other words, a printer 1 that received the recording instruction through the operation of the operation device 70 by the user (S709) and ends the process. In a case where each printer 1 of the image recording system 300 has a failure nozzle proportion P exceeding the threshold Pt, the recording instruction is returned from a printer 1 that last received the recording instruction to a printer 1 that first received the recording instruction.

The controller 80 of the printer 1 performs image recording (S704) in a case where the controller 80 determines that the received recording instruction is a returned recording instruction that is returned from a controller 80 of a printer 1 that last received the recording instruction in S709 (S701: YES).

Figure 11:
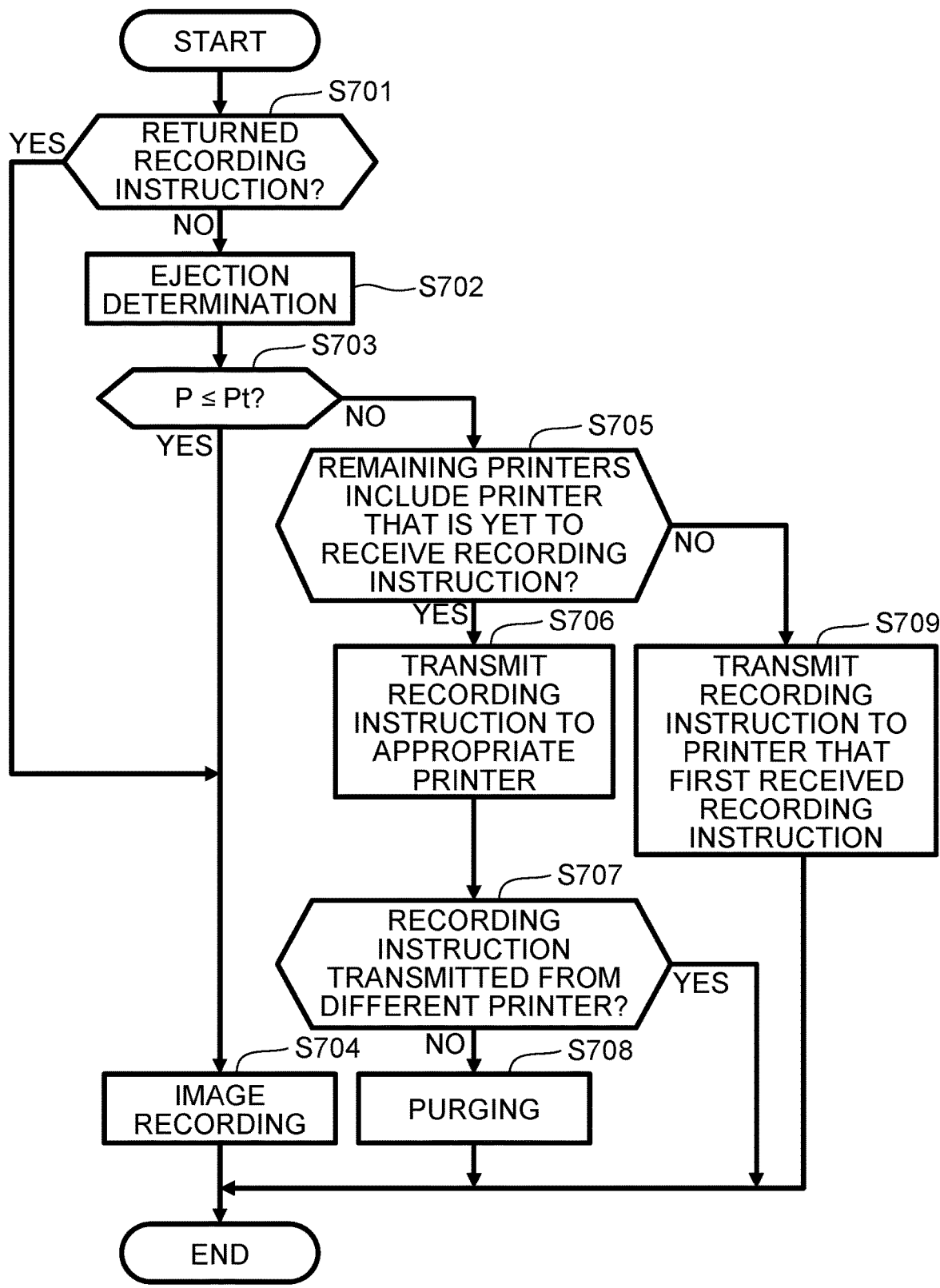
FIG. 11 is a flowchart of a process performed in each printer of the image recording system in image recording.

In the third embodiment, as described above, each printer 1 in the image recording system 300 performs processing in accordance with the flowchart of FIG. 11, and thus all printers 1 in the image recording system 300 operate as follows as a whole. In a printer 1 that first received a recording instruction, ejection determination is performed (S702) to determine whether the printer 1 has a failure nozzle proportion P smaller than or equal to the threshold Pt (S703), and then image recording is performed (S704) in response to determination that the printer 1 has the failure nozzle proportion P smaller than or equal to the threshold Pt (S703: YES).

In a printer 1 that first received the recording instruction and has a failure nozzle proportion P exceeding the threshold Pt (S703: NO), the controller 80 transmits the recording instruction to a printer 1 that is yet to receive the recording instruction (S706), and then performs purging (S708).

Thereafter, in the image recording system 300, each printer 1 that has received a recording instruction repeats ejection determination (S702) and transmission of the recording instruction to a different printer 1 (S706) based on an ejection determination result that the failure nozzle proportion P exceeds the threshold Pt (S703: NO) until every printer 1 that is yet to receive the recording instruction (S705: YES) receives the recording instruction (S706) and every printer 1 having a failure nozzle proportion P smaller than or equal to the threshold Pt receives the recording instruction. In the third embodiment, the repeated operation is an example of a recording instruction transmission operation.

In any printer 1 having a failure nozzle proportion P smaller than or equal to the threshold Pt, the controller 80 performs ejection determination in response to receiving the recording instruction (S702), determines based on an ejection determination result whether the failure nozzle proportion P is smaller than or equal to the threshold (S703), and performs image recording (S704) in response to determining that the failure nozzle proportion P is smaller than or equal to the threshold Pt (S703:YES).

In a case where each printer 1 of the image recording system 300 has a failure nozzle proportion P exceeding the threshold Pt, the recording instruction is returned from a printer 1 that last received the recording instruction to a printer 1 that first received the recording instruction (S709). Then, image recording is performed on the printer 1 that first received the recording instruction (S701: YES, S704). At this time, image recording is performed after any failure nozzles are restored by purging.

Effects

In a case where image recording is performed on a user-specified printer having a high failure nozzle proportion P, suction purging is performed before image recording. In this case, a period of time from reception of a recording instruction to the completion of image recording is extended by the length of the suction purging.

In the third embodiment, however, when a certain printer 1 receives a recording instruction and has a failure nozzle proportion P smaller than or equal to the threshold Pt, image recording is performed on the certain printer 1. In contrast, if the certain printer 1 has a failure nozzle proportion P exceeding the threshold Pt and a different printer has a failure nozzle proportion P smaller than that of the certain printer 1, the certain printer 1 transmits the recording instruction to the different printer 1.

In a case where the certain printer 1 does not perform suction purging before image recording, the period of time until the completion of image recording is not extended. In this case, image recording can be performed on the certain printer 1 in accordance with the user selection even if a different printer 1 has a smaller failure nozzle proportion P than that of the certain printer 1. In contrast, in a case where the certain printer 1 performs suction purging before image recording, the period of time until the completion of image recording is extended by the length of the suction purging. In this case, a different printer 1 having a failure nozzle proportion P smaller than or equal to the threshold Pt may be used to perform image recording and to shorten the period of time until the completion of image recording.

In the third embodiment, a printer 1 repeats transmission of a recording instruction to a different printer 1 until every printer 1 having a failure nozzle proportion P smaller than or equal to the threshold Pt receives the recording instruction. Any printer 1 having a failure nozzle proportion P smaller than or equal to the threshold Pt performs image recording in response to receiving the recording instruction. This enables any printer 1 having a failure nozzle proportion P smaller than or equal to the threshold Pt to perform image recording.

In the third embodiment, the certain printer 1 performs suction purging while the recording instruction transmission operation is repeated. In a case where any printers do not have a failure nozzle proportion P smaller or equal to the threshold Pt, the recording instruction is returned to the certain printer 1 to perform image recording thereon. This can shorten the length of time until image recording is completed in the certain printer 1 compared to a case where a recording instruction is returned to the certain printer 1 and image recording is performed on the certain printer 1 after purging.

Modifications

While the disclosure has been described in detail with reference to the first to third embodiments, various changes, arrangements and modifications may be applied therein without departing from the spirit and scope of the disclosure.

In the first and second embodiments, in a case where a user-specified printer 1 has a failure nozzle proportion P exceeding the threshold Pt, each of other printers 1 perform ejection determination to determine whether there is a printer 1 with a failure nozzle proportion P smaller than or equal to the threshold Pt. In a case where there is such a printer 1, the printer 1 is determined as a printer to be used for image recording. However, a printer to be used for image recording may be determined in a different manner.

Figure 12:
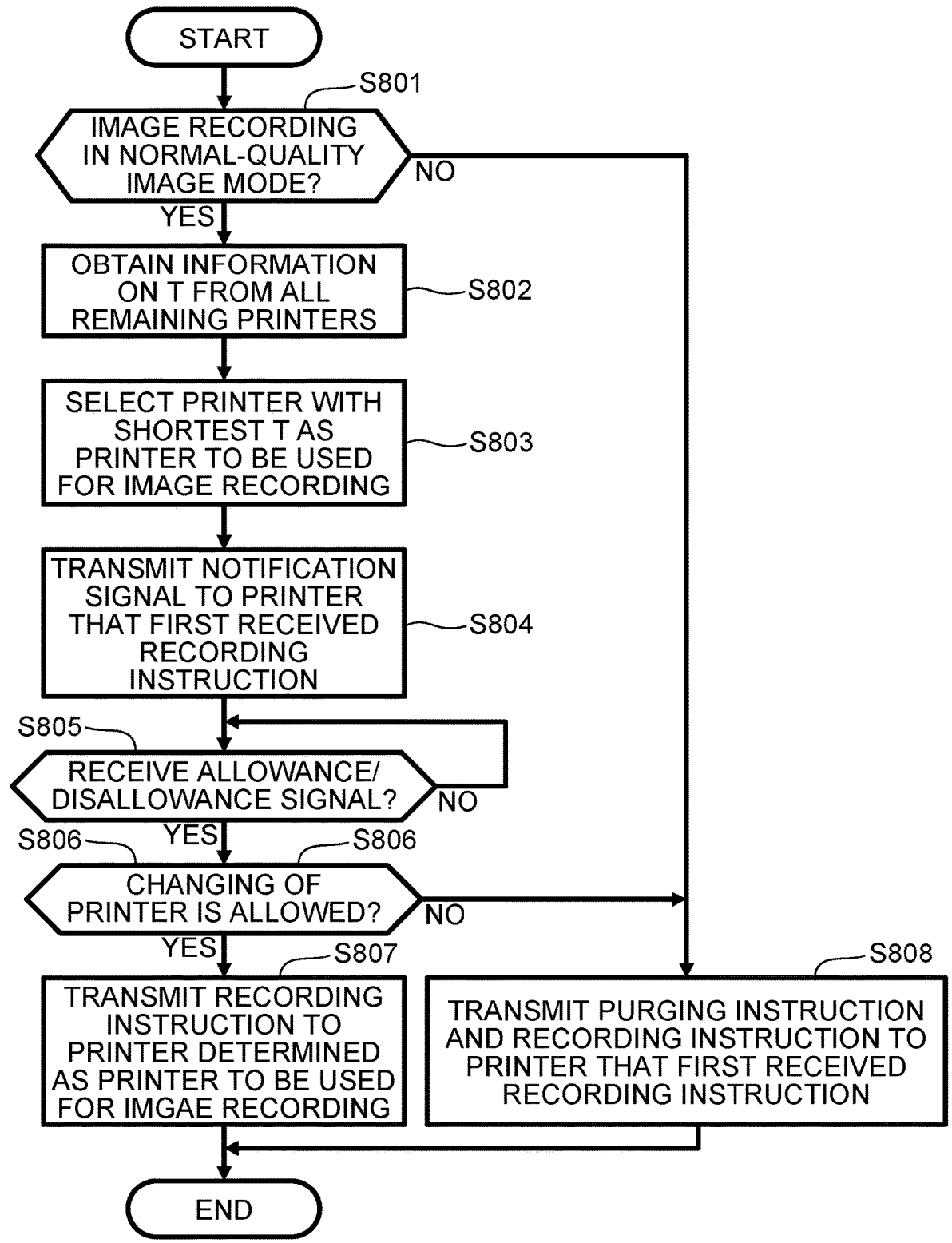
FIG. 12 is a flowchart of a process performed in a server in image recording.

In a first modification applied to the first embodiment, a server 2 executes processing in accordance with the flowchart of FIG. 12 in response to receiving a recording instruction and an ejection determination result from a printer 1. More specifically, in response to determining that the recording instruction indicates image recording in the normal-quality image mode (S801: YES), the server 2 obtains information on an elapsed time T since the previous image recording from all of the remaining printers 1 except for the printer 1 that transmitted the recording instruction and the ejection determination result to the server 2 (S802). The information on the elapsed time T since the previous image recording includes an item of information on the elapsed time T itself, and an item of information on a time at which the previous image recording was performed.

Subsequently, the server 2 determines, based on the information obtained in S802, a printer 1 having the shortest elapsed time T as a printer 1 to be used for image recording (S803). The server 2 then performs steps S804 to S808, which are similar to steps S207 to S211 in the first embodiment. In response to determining that the recording instruction indicates image recording in the high-quality image mode (S801: NO), the server 2 transmits the recording instruction and a purging instruction to a printer 1 that first received the recording instruction (S808), and ends the process.

Among the printers 1, a printer 1 having a shorter elapsed time T from the previous image recording is likely to have a smaller failure nozzle proportion P. In the first modification, if a certain printer 1 specified by the user has a failure nozzle proportion P exceeding the threshold Pt and receives a recording instruction indicating that image recording is performed in the normal-quality image mode where the high image quality is not required, a different printer having the shortest elapsed time T since the previous image recording is selected from other printers 1 except the certain printer 1, and image recording is performed on the different printer 1. In other words, ejection determination before image recording to determine a printer 1 having the smallest failure nozzle proportion P among the other printers 1 is not performed on the other printers 1. This enables image recording to be performed with the image quality as high as possible and in a period of time as short as possible.

The first modification that uses the elapsed time T to determine a printer 1 to be used for image recording is applied to the first embodiment, but may be applied to the second embodiment.

The first modification shows, but is not limited to, that a printer to be used for image recording is determined based on the elapsed time only when the recording instruction indicates image recording in the normal-quality image mode. For example, a printer to be used for image recording may be determined based on the elapsed time T regardless of whether image recording is performed in the normal-quality image mode or the high-quality image mode.

The first and second embodiments show, but are not limited to, that, in a case where all printers 1 have a failure nozzle proportion P exceeding the threshold Pt and the recording instruction indicates image recording in the normal-quality image mode, a printer 1 having the smallest failure nozzle proportion P among all printers 1 is determined as a printer to be used for image recording. Regardless of whether image recording is performed in the normal-quality image mode or the high-quality image mode, a printer 1 having the smallest failure nozzle proportion P may be determined as a printer to be used for image recording.

The first and second embodiments show, but are not limited to, that, in a case where all printers 1 have a failure nozzle proportion P exceeding the threshold Pt and the recording instruction indicates image recording in the high-quality image mode, a purging instruction and the recording instruction are transmitted to a printer 1 first specified by the user.

In a second modification applied to the first embodiment, the controller 80 of each printer 1 is configured to selectively perform one of different suction purging operations, which vary in length of time to drive, for example, the suction pump 72. In response to receiving a purging instruction from the server 2, the controller 80 performs one of the suction purging operations in accordance with an ejection determination result (for example, the number or distribution of failure nozzles).

Figure 13:
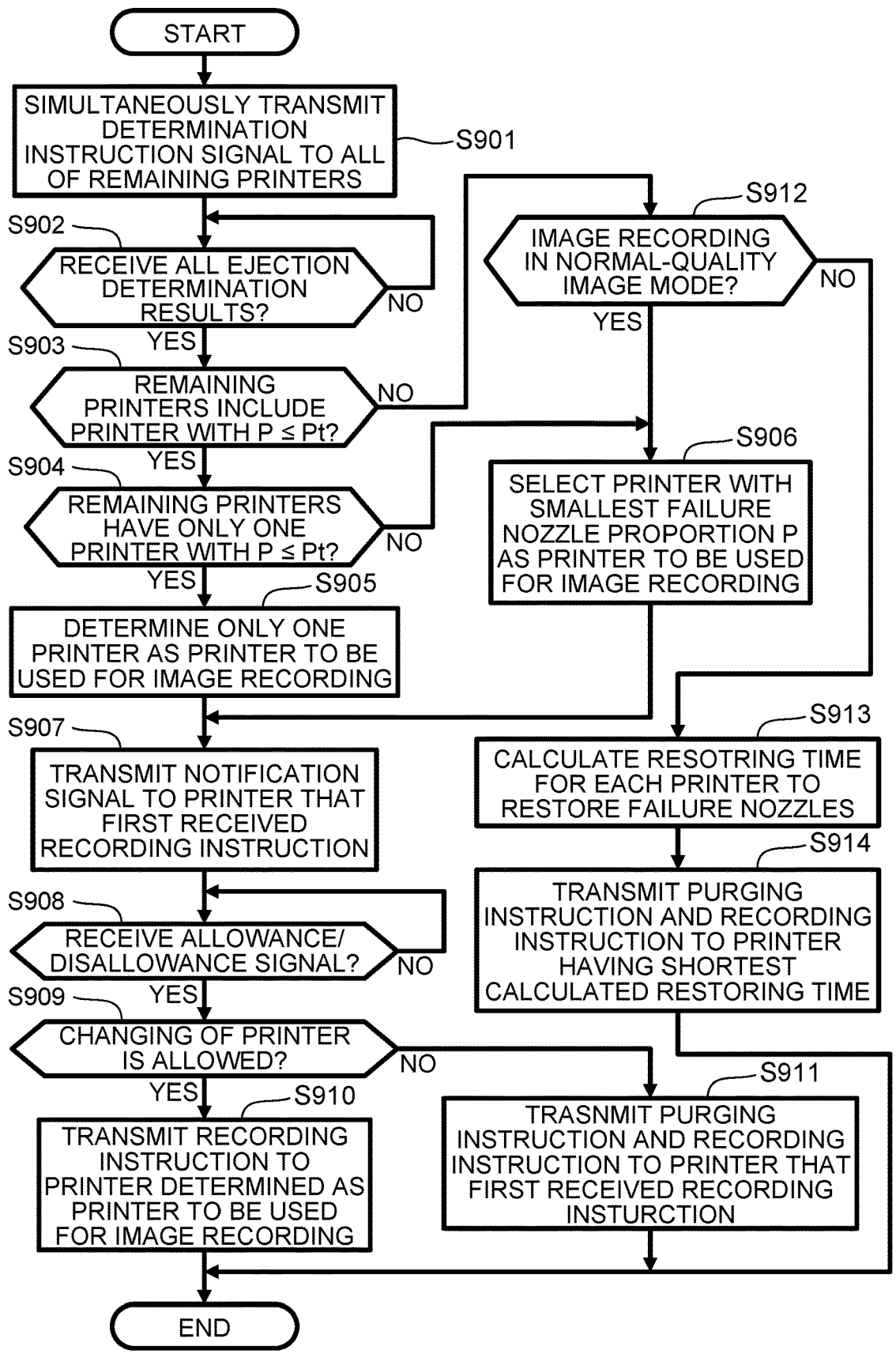
FIG. 13 is a flowchart of a process performed in a server in image recording.

In the second modification, in response to receiving the recording instruction and the ejection determination result from a printer 1, the server 2 executes processing in accordance with the flowchart of FIG. 13.

More specifically, the server 2 performs steps S901 to S912, which are similar to steps S201 to S212 in the first embodiment. In the second modification, however, in response to determining that the printers 1 do not include a printer 1 having a failure nozzle proportion P smaller or equal to the threshold Pt, in other words, each printer 1 has a failure nozzle proportion P exceeding the threshold Pt (S903: NO) and the recording instruction indicates image recording in the high-quality image mode (S912: NO), the server 2 calculates a restoring time for each printer 1 to restore failure nozzles by purging, that is, a length of time for each printer 1 to perform purging (S913). In S913, the server 2 calculates the restoring time for each printer 1 by assuming the type of suction purging based on the number or distribution of failure nozzles indicated in the ejection determination result transmitted from each printer 1. The server 2 transmits the purging instruction and the recording instruction to a printer 1 having the shortest calculated restoring time (S914).

In a case where all printers 1 have a failure nozzle proportion P exceeding the threshold Pt and the recording instruction indicates image recording in the high-quality image mode where the high image quality is required, a purging instruction and the recording instruction are transmitted to a printer 1 having the shortest restoring time and purging is performed on the printer 1 before image recording. This enables image recording to be performed with the image quality as high as possible and in a period of time as short as possible.

The second modification shows, but is not limited to, that, in a case where the recording instruction indicates image recording in the high-quality image mode (S912: NO), the process goes to S913 and then S914. For example, steps S913 and S914 may be performed after steps similar to steps S907 to S909. Steps S913 and S914 may be performed in a case where the user allows the changing of a printer 1 to be used for image recording. In a case where the user disallows the changing of a printer to be used for image recording, step S911 may be performed.

The second modification applied to the first embodiment shows that, in a case where all printers 1 have a failure nozzle proportion P exceeding the threshold Pt and the recording instruction indicates image recording in the high-quality image mode, a purging instruction and the recording instruction are transmitted to a printer 1 having the shortest restoring time. The second modification may be applied to the second embodiment in the same case as described above.

In the first and second embodiments, in a case where all printers 1 have a failure nozzle proportion P exceeding the threshold Pt and the recording instruction indicates image recording in the high-quality image mode, a purging instruction and the recording instruction may be transmitted to a printer 1 different from a printer 1 that first received the recording instruction described above.

The first and second embodiments show, but are not limited to, that, in a case where two or more printers 1 have a failure nozzle proportion P smaller than or equal to the threshold Pt, a printer 1 having the smallest failure nozzle proportion P among the printers 1 is determined as a printer to be used for image recording. A printer 1 different from a printer 1 that first received the recording instruction described above may be determined among the printers 1 having a failure nozzle proportion P smaller than or equal to the threshold Pt, as a printer to be used for image recording. For example, information transmitted from each printer 1 to the server 2 may include a location of the printer 1, and a printer 1 located closest to a user-defined printer 1 may be determined among printers 1 having a failure nozzle proportion P smaller than or equal to the threshold Pt, as a printer to be used for image recording.

The first embodiment shows, but is not limited to, that the server 2 transmits an ejection instructing signal to other printers 1, at the same time, except the printer 1 that transmitted the recording instruction and the ejection determination result to the server 2, and the controllers 80 of the other printers 1 perform ejection determination at almost the same time. The second embodiment shows, but is not limited to, that the server 2 transmits an ejection instructing signal to all printers 1 at the same time in response to receiving the recording instruction, and the controllers 80 of all printers 1 perform ejection determination at almost the same time. For example, in the first and second embodiments, the server 2 may transmit a determination instruction signal to the printers 1 at intervals.

The first embodiment shows, but is not limited to, that a recording instruction is input to a printer 1 through the user operation of the operation device 70 of the printer 1. For example, a recording instruction may be input to a printer 1 from a PC connected to the printer 1 directly or via the network 3. In this case, in S207, for example, the server 2 may transmit, to the PC, a notification signal to instruct a display of the PC to provide notification that a printer to be used for image recording is changed. The user may transmit an allowance/disallowance signal to the server 2 through the operation of the PC.

The second embodiment shows, but is not limited to, that a recording instruction is input to the server 2 from the PC 201 connected to the server 2 via the network 3. For example, a recording instruction may be input to the server 2 through the user operation of the operation device 70 of a printer 1. In this case, in S609, for example, the server 2 may transmit, to a printer 1 to which the user has input a recording instruction, a notification signal to instruct the display 69 of the printer 1 to provide notification that a printer to be used for image recording is changed. The user may transmit an allowance/disallowance signal to the server 2 through the operation of the operation device 70 of the printer 1.

The first and second embodiments show, but are not limited to, that, in a case where the certain printer 1 has a failure nozzle proportion P exceeding the threshold Pt and a different printer 1 has a failure nozzle proportion P smaller than or equal to the threshold Pt, the different printer 1 is determined as a printer to be used for image recording only when allowed by the user. For example, the different printer 1 may be used for image recording without notification to the user.

In the third embodiment, in a case where a printer 1 that first received the recording instruction has a failure nozzle proportion P exceeding the threshold Pt, the printer 1 transmits the recording instruction to a printer 1 that is yet to receive the recording instruction, and then performs purging (S708). In a case where all printers 1 have a failure nozzle proportion P exceeding the threshold Pt, in response to the recording instruction returned to a printer 1 that first received the recording instruction, image recording is performed on the printer 1 that has performed purging. However, purging may be performed in a different timing.

For example, in a case where the certain printer 1 that first received the recording instruction has a failure nozzle proportion P exceeding the threshold Pt, the recording instruction may be transmitted to the different printer 1 and suction purging may not be performed at this time. In a case where all printers 1 have a failure nozzle proportion P exceeding the threshold Pt, in response to the recording instruction returned to the certain printer 1 that first received the recording instruction, purging may be performed on the certain printer 1 before image recording.

Alternatively, before image recording, purging may be performed on a printer 1 that last received the recording instruction.

In the third embodiment, until every printer 1 having a failure nozzle proportion P smaller than or equal to the threshold Pt receives the recording instruction, the controller 80 of a printer 1 that has received the recording instruction repeats ejection determination and transmission of the recording instruction to another printer 1 in accordance with an ejection determination result that the failure nozzle proportion P exceeds the threshold Pt. However, the recording instruction may be transmitted to another printer 1 in a different timing.

For example, the image recording system 300 may include a large number of printers 1. In this case, even if the printers 1 include a printer 1 that is yet to receive a recording instruction at the time when the recording instruction has been transmitted from one printer 1 to another printer 1 a specified number of times more than one, the recording instruction may be returned from a printer 1 that has received the recording instruction to a printer 1 that first received the recording instruction. Alternatively, purging may be performed on a printer 1 that last received the recording instruction at that point before image recording.

In the third embodiment, in a case where the failure nozzle proportion P exceeds the threshold Pt in S703, the controller 80 may perform steps similar to S207 to S209 in the first embodiment, and then proceed to S705 in a case where the user allows changing of a printer 1 to be used for image recording. In a case where the user does not allow the changing of a printer 1 to be used for image recording, the controller 80 may transmit a purging instruction and the recording instruction to a printer 1 that first received the recording instruction, causing the printer 1 to perform purging and then image recording.

The first embodiment shows, but is not limited to, that a recording instruction is input to a printer 1 by the user using the operation device 70 of the printer 1. For example, a recording instruction may be input to a printer 1 from a PC connected to the printer 1 directly or via the network 3.

The first to third embodiments show, but are not limited to, that the determination circuit 78 outputs a signal responsive to whether a nozzle 10 is a failure nozzle in accordance with a potential of the detection electrode 76 when ink is ejected from the nozzle 10 toward the detection electrode 76. However, ink ejected from the nozzle 10 may not be directed toward the detection electrode 76.

For example, instead of the detection electrode 76, a detection electrode elongated vertically may be disposed such that ink ejected from the nozzle 10 may pass an area parallel to the elongated detection electrode, and a signal responsive to whether a nozzle is a failure nozzle may be output from the determination circuit. Alternatively, an optical sensor may be disposed to detect ink ejected from a nozzle 10, and a signal responsive to whether a nozzle is a failure nozzle may be output from the optical sensor. The optical sensor is an example of a signal output unit.

Alternatively, a known technique for outputting a determination signal may be adopted. For example, a printer may include a voltage detection circuit connected to a nozzle plate of an inkjet head. In response to the inkjet head being driven for ejecting ink from a nozzle, the voltage detection circuit may detect changes in voltage at the voltage detection circuit and output a signal responsive to whether the nozzle is a failure nozzle to the controller 80. The voltage detection circuit is another example of the signal output unit.

Alternatively, another known technique for outputting a determination signal may be adopted. For example, a substrate of an inkjet head may include a temperature detection element. The temperature detection element is another example of the signal output unit. In such a case, a first voltage may be applied to a heater to allow the inkjet head to eject ink from a nozzle. Then, a second voltage may be applied to the heater not to allow the inkjet head to eject ink from the nozzle. Based on changes in temperature detected by the temperature detection element during a certain time period since the application of the second voltage, a signal responsive to whether the nozzle is a failure nozzle may be output.

In the above embodiments and modifications, a nozzle that does not eject ink is determined as a failure nozzle. However, a failure nozzle is not limited to such a nozzle. For example, a signal output unit may be used to output a signal responsive to whether ink is ejected from a nozzle 10 in an intended direction. Based on the signal output from the signal output unit, a nozzle 10 from which ink is ejected in an unintended direction may be determined as a failure nozzle.

In the above description, suction purging is performed in purging. However, purging is not limited to suction purging. For example, a booster pump may be disposed in portions of the tubes 25 connecting the subtank 13 and the ink cartridges 24. Alternatively, a printer may include the booster pump to be connected to an ink cartridge. The booster pump may be driven in a state where the nozzles 10 are covered by the cap 71 to increase the pressure of ink in the inkjet head 14, thereby causing the inkjet head 14 to discharge ink from the nozzles 10. This is what is called pressurized purging. In this case, a combination of the cap 71 and the booster pump is an example of discharging means.

Alternatively, both of suction by the suction pump 72 and pressurization by the booster pump may be performed in purging. In this case, a combination of the maintenance unit 18 and the booster pump is an example of discharging means.

Alternatively, instead of purging, flushing may be performed. In flushing, the carriage 2 may be in the maintenance position, and the inkjet head 4 may be driven to eject ink from the nozzles 10. In this case, the inkjet head 14 serves as a recording head and discharging means.

Alternatively, both of purging and flushing may be performed. In this case, the maintenance unit 18 and the inkjet head 14 are an example of discharging means.

The disclosure has been applied to a printer including a serial head that moves in the scanning direction together with a carriage. However, the disclosure may also be applied to a printer including, for example, a line head extending over the entire length of a recording sheet S in the scanning direction.

The disclosure has been applied to a printer that ejects ink from nozzles to record an image on a recording sheet S. However, the disclosure may also be applied to an image recording system including a plurality of printers that each may record an image on a recording medium other than a recording sheet. Examples of the recording media include a T-shirt, a sheet for outdoor advertisement, a casing of a mobile terminal such as a smartphone, a cardboard, and a resin member. Further, the disclosure may also be applied to an image recording system including a plurality of liquid ejection apparatuses that each may eject liquid other than ink such as liquid resin or liquid metal.

What is claimed is:

1. An image recording system comprising:
   a plurality of image recording apparatuses, each image recording apparatus including:
     a recording head having nozzles and configured to eject liquid from each of the nozzles;
     a signal output unit configured to output a signal responsive to whether a nozzle of the nozzles is a failure nozzle having an abnormal condition in liquid ejection; and
     a controller connected to the signal output unit; and
   a server connected to the image recording apparatuses,
   wherein, in a certain image recording apparatus of the image recording apparatuses, the controller is configured to, in response to receiving a recording instruction to perform image recording:
     perform ejection determination by controlling the recording head to eject ink from each nozzle to determine, based on a signal outputted from the signal output unit, whether the nozzles include a failure nozzle;
     determine, based on an ejection determination result, whether a failure nozzle proportion of failure nozzles of all the nozzles of the recording head is smaller than or equal to a threshold;
     in response to determining that the failure nozzle proportion is smaller or equal to the threshold, control the recording head to perform image recording based on the recording instruction; and
     in response to determining that the failure nozzle proportion exceeds the threshold, transmit the recording instruction and the ejection determination result to the server,
   wherein the server is configured to, in response to receiving the recording instruction and the ejection determination result from the certain image recording apparatus:
     determine whether the image recording apparatuses include a different image recording apparatus having a failure nozzle proportion smaller than that of the certain image recording apparatus; and
     in response to determining that the image recording apparatuses include a different image recording apparatus having a failure nozzle proportion smaller than that of the certain image recording apparatus, transmit the recording instruction to the different image recording apparatus,
   wherein, in the different image recording apparatus, the controller is configured to, in response to receiving the recording instruction from the server, control the recording head to perform image recording based on the recording instruction.

2. The image recording system according to claim 1, wherein the server is configured to, in response to receiving the recording instruction and the ejection determination result from the certain image recording apparatus, transmit a determination instruction signal to perform the ejection determination to each image recording apparatus except the certain image recording apparatus,
   wherein, in each image recording apparatus except the certain image recording apparatus, the controller is configured to, in response to receiving the determination instruction signal, perform the ejection determination and transmit an ejection determination result to the server,
   wherein the server is configured to determine, based on the ejection determination result received from each image recording apparatus except the certain image recording apparatus, whether the image recording apparatuses include the different image recording apparatus.

3. The image recording system according to claim 2, wherein the server is configured to simultaneously transmit the determination instruction signal to each image recording apparatus except the certain image recording apparatus.

4. The image recording system according to claim 2, wherein each image recording apparatus further includes discharging means for performing a discharging operation in which liquid in the recording head is discharged from the nozzles,
   wherein each image recording apparatus has a first recording mode and a second recording mode where image recording is performed with a higher quality than that of the first recording mode,
   wherein the server is configured to, in response to determining that each image recording apparatus has a failure nozzle proportion exceeding the threshold and the recording instruction indicates image recording in the first recording mode, determine an image recording apparatus having the smallest failure nozzle proportion as the different image recording apparatus, and transmit the recording instruction to the image recording apparatus,
   wherein, in the image recording apparatus, the controller is configured to, in response to receiving the recording instruction, control the recording head to perform image recording based on the recording instruction,
   wherein the server is configured to, in response to determining that the recording instruction indicates image recording in the second recording mode, transmit a discharging instruction signal to perform the discharging operation to one of the image recording apparatuses, wherein, in the image recording apparatus receiving the discharging instruction signal and the recording instruction, the controller is configured to control the discharging means to perform the discharging operation and then control the recording head based on the recording instruction to perform image recording.

5. The image recording system according to claim 4, wherein the server is configured to, in response to determining that each image recording apparatus has a failure nozzle proportion exceeding the threshold and the recording instruction indicates image recording in the second recording mode:
   calculates a length of time for each image recording apparatus to perform the discharging operation based on the ejection determination result transmitted from each image recording apparatus; and
   transmit the discharging instruction signal and the recording instruction to an image recording apparatus having the shortest length of time to perform the discharging operation.

6. The image recording system according to claim 4, wherein the server is configured to, in response to determining that each image recording apparatus has a failure nozzle proportion exceeding the threshold and the recording instruction indicates image recording in the second recording mode, transmit the discharging instruction signal and the recording instruction to the certain image recording apparatus.

7. The image recording system according to claim 3, wherein the server is configured to, in response to determining that the image recording apparatuses include one or more different image recording apparatuses each having a failure nozzle proportion smaller than that of the certain image recording apparatus, selects a different image recording apparatus having the smallest failure nozzle proportion from the one or more different image recording apparatuses and transmit the recording instruction to the different image recording apparatus.

8. The image recording system according to claim 1, wherein each image recording apparatus has a first recording mode and a second recording mode where image recording is performed with a higher quality than that of the first recording mode,
   wherein the server is configured to, in response to determining that the certain image recording apparatuses has a failure nozzle proportion exceeding the threshold and the recording instruction indicates image recording in the first recording mode, select from the image recording apparatus an image recording apparatus having the shortest elapsed time since previous image recording and determined the selected image recording apparatus as the different image recording apparatus, and transmit the recording instruction to the selected image recording apparatus.

9. The image recording system according to claim 1, wherein each image recording apparatus further includes a notification device,
   wherein the server includes a signal input device to which an allowance/disallowance signal is input, the allowance/disallowance signal indicating whether changing of an image recording apparatus to be used for image recording is allowed or disallowed,
   wherein the server is configured to, in response to determining that the certain image recording apparatus has a failure nozzle proportion exceeding the threshold and the image recording apparatuses include the different image recording apparatus:
      transmit to the certain image recording apparatus a notification signal to instruct the notification device to provide notification that an image recording apparatus to be used for image recording is changed;
      set the signal input device to be ready to accept an input of the allowance/disallowance signal transmitted from the certain image recording apparatus; and
      in response to the input of the allowance/disallowance signal indicating that changing of an image recording to be used for image recording is allowed, transmit the recording instruction to the different image recording apparatus.

10. An image recording system comprising:
a plurality of image recording apparatuses, each image recording apparatus including:
   a recording head having nozzles and configured to eject liquid from each of the nozzles;
   a signal output unit configured to output a signal responsive to whether a nozzle of the nozzles is a failure nozzle having an abnormal condition in liquid ejection; and
   a controller connected to the signal output unit; and
a server connected to the image recording apparatuses and configured to receive a recording instruction to instruct a certain image recording apparatus of the image recording apparatuses to perform image recording,
wherein the server is configured to, in response to receiving the recording instruction, transmit, to the certain image recording apparatus, a determination instruction signal to perform an ejection determination by controlling the recording head to eject ink from each nozzle to determine, based on a signal output from the signal output unit, whether the nozzles include a failure nozzle,
wherein, in the certain image recording apparatus, the controller is configured to, in response to receiving the determination instruction signal:
   perform the ejection determination and determine, based on an ejection determination result, whether a failure nozzle proportion of failure nozzles of all the nozzles of the recording head is smaller than or equal to a threshold; and
   transmit the ejection determination result to the server,
wherein the server is configured to, in response to receiving the ejection determination result indicating that the failure nozzle proportion is smaller than or equal to the threshold, transmit the recording instruction to the certain image recording apparatus,
wherein, in the certain image recording apparatus, the controller is configured to, in response to receiving the recording instruction, control the recording head to perform image recording based on the recording instruction,
wherein the server is configured to, in response to receiving the ejection determination result indicating that the failure nozzle proportion exceeds the threshold:
   determine whether the image recording apparatuses include a different image recording apparatus having a failure nozzle proportion smaller than that of the certain image recording apparatus; and
   in response to determining that the image recording apparatuses include a different image recording apparatus having a failure nozzle proportion smaller than that of the certain image recording apparatus, transmit the recording instruction to the different image recording apparatus, and wherein, in the different image recording apparatus, the controller is configured to, in response to receiving the recording instruction, control the recording head to perform image recording based on the recording instruction.

11. The image recording system according to claim 10, wherein the server is configured to, in response to receiving the recording instruction to instruct the certain image recording apparatus to perform image recording, transmit the determination instruction signal to each image recording apparatus including the certain image recording apparatus,
wherein, in each image recording apparatus, the controller is configured to, in response to receiving the determination instruction signal, perform the ejection determination and transmit an ejection determination result to the server,
wherein the server is configured to, in response to receiving an ejection determination result indicating that the certain image recording apparatus has a failure nozzle proportion exceeding the threshold, determine, based on the ejection determination result, whether the image recording apparatuses except the certain image recording apparatus includes the different image recording apparatus.

12. The image recording system according to claim 11, wherein the server is configured to simultaneously transmit the determination instruction signal to the image recording apparatuses including the certain image recording apparatus.

13. The image recording system according to claim 10, further comprising an external apparatus including a notification device,
wherein the server includes a signal input device to which an allowance/disallowance signal is input, the allowance/disallowance signal indicating whether changing of an image recording apparatus to be used for image recording is allowed or disallowed,
wherein the server is configured to, in response to determining that the certain image recording apparatus has a failure nozzle proportion exceeding the threshold and the image recording apparatuses include the different image recording apparatus:
transmit to the external apparatus a notification signal to instruct the notification device to provide notification device to notify that an image recording apparatus to be used for image recording is changed,
set the signal input device to be ready to accept an input of the allowance/disallowance signal transmitted from the external apparatus, and
in response to the input of the allowance/disallowance signal indicating that changing of an image recording apparatus to be used for image recording is allowed, transmit the recording instruction to the different image recording apparatus.

14. An image recording system, comprising:
a plurality of image recording apparatuses connected to each other, each image recording apparatus including:
a recording head having nozzles and configured to eject liquid from each of the nozzles;
a signal output unit configured to output a signal responsive to whether a nozzle of the nozzles is a failure nozzle having an abnormal condition in liquid ejection; and
a controller connected to the signal output unit,
wherein, in a certain image recording apparatus of the image recording apparatuses, the controller is configured to, in response to receiving a recording instruction to perform image recording:
perform ejection determination by controlling the recording head to eject ink from each nozzle to determine, based on a signal outputted from the signal output unit, whether the nozzles include a failure nozzle;
determine, based on an ejection determination result, whether a failure nozzle proportion of failure nozzles of all the nozzles of the recording head is smaller than or equal to a threshold;
in response to determining that the failure nozzle proportion is smaller or equal to the threshold, control the recording head to perform image recording based on the recording instruction; and
in response to determining that the failure nozzle proportion exceeds the threshold, transmit the recording instruction and the ejection determination result to an image recording apparatus of the image recording apparatuses, the image recording apparatus being different from the certain image recording apparatus.

15. The image recording system according to claim 14,
wherein, in the image recording apparatus receiving the recording instruction, the controller is configured to repeat a recording instruction transmission operation until each of the image recording apparatuses having a failure nozzle proportion smaller than or equal to the threshold receives the recording instruction, the recording instruction transmission operation being the ejection determination and transmission of the recording instruction to an image recording apparatus that is yet to receive the recording instruction based on an ejection determination result that the failure nozzle proportion exceeds the threshold,
wherein, in each of the image recording apparatus having a failure nozzle proportion smaller than or equal to the threshold, the controller is configured to, in response to receiving the recording instruction:
perform the ejection determination;
determine, based on an ejection determination result, whether a failure nozzle proportion is smaller than or equal to the threshold; and
in response to determining that the failure nozzle proportion is smaller than or equal to the threshold, control the recording head to perform image recording based on the recording instruction.

16. The image recording system according to claim 15, wherein each image recording apparatus further includes discharging means for performing a discharging operation in which liquid in the recording head is discharged from the nozzles,
wherein, in the certain image recording apparatus, the controller is configured to control the discharging means to perform the discharging operation while the recording instruction transmission operation is repeated,
wherein, in a case where every image recording apparatus of the image recording apparatuses except the certain image recording apparatus has a failure nozzle proportion exceeding the threshold, the controller of an image recording apparatus that has last received the recording instruction is configured to transmit the recording instruction to the certain image recording apparatus,
wherein, in the certain image recording apparatus, the controller is configured to, in response to receiving the recording instruction, control the recording head to perform image recording based on the recording instruction.

* * * * *